(12) United States Patent
Zhamu et al.

(10) Patent No.: US 11,374,216 B2
(45) Date of Patent: Jun. 28, 2022

(54) GRAPHENE FOAM-PROTECTED PHOSPHORUS MATERIAL FOR LITHIUM-ION OR SODIUM-ION BATTERIES

(71) Applicant: Global Graphene Group, Inc., Dayton, OH (US)

(72) Inventors: Aruna Zhamu, Springboro, OH (US); Yu-Sheng Su, Dayton, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 319 days.

(21) Appl. No.: 16/677,126

(22) Filed: Nov. 7, 2019

(65) Prior Publication Data

US 2021/0143409 A1  May 13, 2021

(51) Int. Cl.
*H01M 4/36* (2006.01)
*H01M 4/583* (2010.01)
(Continued)

(52) U.S. Cl.
CPC ......... *H01M 4/366* (2013.01); *H01M 4/0404* (2013.01); *H01M 4/583* (2013.01); *H01M 4/667* (2013.01); *H01M 4/808* (2013.01); *H01M 10/0525* (2013.01); *H01M 10/36* (2013.01); *H01M 4/13* (2013.01); *H01M 4/38* (2013.01);
(Continued)

(58) Field of Classification Search
CPC ........... H01M 10/0525; H01M 10/054; H01M 10/36; H01M 2004/021; H01M 2004/027; H01M 4/0404; H01M 4/13; H01M 4/366; H01M 4/38; H01M 4/583; H01M 4/625; H01M 4/663; H01M 4/667; H01M 4/808; Y02E 60/10
See application file for complete search history.

(56) References Cited

U.S. PATENT DOCUMENTS

| 7,071,258 B1 | 7/2006 | Jang et al. |
| 2005/0271574 A1 | 12/2005 | Jang et al. |

(Continued)

OTHER PUBLICATIONS

Hummers et al., "Preparation of graphitic oxide" J. Am. Chem. Soc. (1958) vol. 80, p. 1339.
(Continued)

*Primary Examiner* — Lingwen R Zeng

(57) ABSTRACT

A lithium- or sodium-ion battery anode layer, comprising a phosphorus material embedded in pores of a solid graphene foam composed of multiple pores and pore walls, wherein (a) the pore walls contain a pristine graphene or a non-pristine graphene material; (b) the phosphorus material contains particles or coating of P or $MP_y$ (M=transition metal and $1 \leq y \leq 4$) and is in an amount from 20% to 99% by weight based on the total weight of the graphene foam and the phosphorus material combined, and (c) the multiple pores are lodged with particles or coating of the phosphorus material. Preferably, the solid graphene foam has a density from 0.01 to 1.7 g/cm³, a specific surface area from 50 to 2,000 m²/g, a thermal conductivity of at least 100 W/mK per unit of specific gravity, and/or an electrical conductivity no less than 1,000 S/cm per unit of specific gravity.

40 Claims, 8 Drawing Sheets

(51) Int. Cl.
  H01M 10/0525    (2010.01)
  H01M 10/36      (2010.01)
  H01M 4/04       (2006.01)
  H01M 4/66       (2006.01)
  H01M 4/80       (2006.01)
  H01M 4/02       (2006.01)
  H01M 4/38       (2006.01)
  H01M 4/62       (2006.01)
  H01M 4/13       (2010.01)
  H01M 10/054     (2010.01)

(52) U.S. Cl.
  CPC .......... *H01M 4/625* (2013.01); *H01M 4/663* (2013.01); *H01M 10/054* (2013.01); *H01M 2004/021* (2013.01); *H01M 2004/027* (2013.01); *Y02E 60/10* (2013.01)

(56) References Cited

U.S. PATENT DOCUMENTS

2008/0048152 A1    2/2008   Jang et al.
2017/0214035 A1*   7/2017   Xu .................... H01M 4/043

OTHER PUBLICATIONS

Karlicky et al., "Halogenated Graphenes: Rapidly Growing Family of Graphene Derivatives" ACS Nano (2013) vol. 7, No. 8, pp. 6434-6464.

Chen et al., "Scalable Clean Exfoliation of High-Quality Few-Layer Black Phosphorus for a Flexible Lithium Ion Battery" Advanced Materials (2016) vol. 28, pp. 510-517.

Ding et al., "Phosphorus nanoparticles combined with cubic boron nitride and graphene as stable sodium-ion battery anodes" Electrochimica Acta (2017) vol. 235, pp. 150-157.

Lee et al., "Reduced Graphene Oxide-Encapsulated Phosphorus/Carbon Composite as a Promising Anode Material for High-Performance Sodium-Ion Batteries" J. Materials Chemistry A (2017) DOI: 10 1039/C6TA09967J.

Liu et al., "Red Phosphorus Nanodots on Reduced Graphene Oxide as a Flexible and Ultra-Fast Anode for Sodium-ion Batteries" ACS Nano (2017) vol. 11, pp. 5530-5537.

Ma et al., "Phosphorus and Nitrogen Dual-Doped Few-Layered Porous Graphene: A High-Performance Anode Material for Lithium Ion Batteries" ACS Appl. Mater. Interfaces (2014) vol. 6, pp. 14415-14422.

Pei et al., "Phosphorus Nanoparticles Encapsulated in Graphene Scrolls as a High-Performance Anode for Sodium-Ion Batteries" ChemElectroChem Communications ChemPubSoc Europe (2015) DOI: 10.1002/celc.201500251.

Song et al., Chemically Bonded Phosphorus/Graphene Hybrid as a High Performance Anode for Sodium-Ion Batteries NanoLetters (2014) vol. 14, No. 11, pp. 6329-6335.

Sun et al., "A phosphorene-graphene hybrid material as a high-capacity anode for sodium-ion batteries" Nature Nanotechnology (2015) vol. 10, pp. 980-986.

Yu et al., "Phosphorus-Graphene Nanosheet Hybrids as Lithium-Ion Anode with Exceptional High-Temperature Cycling Stability" Adv. Sci. (2015) DOI: 10.1002/advs.201400020.

Yue et al., "Utilizing a graphene matrix to overcome the intrinsic limitations of red phosphorus as an anode material in lithium-ion batteries" Carbon (2018) vol. 127, pp. 588-595.

Zhang et al., "Amorphous Phosphorus/Nitrogen-Doped Graphene Paper for Ultrastable Sodium-Ion Batteries" NanoLett. (2016) vol. 16, No. 3, pp. 2054-2060.

Zhang et al., "An Air-Stable Densely Packed Phosphorene-Graphene Composite Toward Advanced Lithium Storage Properties" Advanced Energy Materials (2016) vol. 6, p. 1600453.

Zhang et al., "Wet-Chemical Processing of Phosphorus Composite Nanosheets for High-Rate and High-Capacity Lithium-Ion Batteries" Advanced Energy Materials (2016) vol. 6, p. 1502409.

* cited by examiner

GRAPHENE FOAM-PROTECTED PHOSPHORUS MATERIAL FOR LITHIUM-ION OR SODIUM-ION BATTERIES

FIELD

The present disclosure relates generally to the field of lithium-ion battery (LIB) or sodium-ion battery (NIB) and, more particularly, to an anode layer containing a new group of graphene foam-protected phosphorus materials and the process for producing same.

BACKGROUND

Next generation lithium-ion batteries (LIBs) are a prime candidate for energy storage devices within aircraft, electric vehicles (EVs), drones, renewable energy storage, and smart grid applications. Graphite materials have been widely used as an anode active material for commercial LIBs due to their relatively low cost and excellent reversibility. However, the theoretical lithium storage capacity of graphite is only 372 mAh/g (based on $LiC_6$), which limits the total capacity and energy density of a battery. The emerging EV and renewable energy industries demand the availability of rechargeable batteries with a significantly higher energy and power density than what current LIB technology can provide. This requirement has triggered considerable research efforts on the development of electrode materials with higher specific capacity (e.g. Si and P), excellent rate capability, and good cycle stability for LIBs.

Sodium ion batteries (NIBs) have been recognized as the most attractive alternative to the current lithium-ion batteries (LIBs) owing to the natural abundance of sodium. Unfortunately, the low energy density, inferior power density and poor cycle life are still the main issues for NIBs that have prevented NIBs from successful commercialization. The current preferred choice for sodium-ion anode material is hard carbon, which was shown to deliver a specific capacity of 300 mAh/g. The alternative NIB anode materials being considered include Si, Sn, P, and metal oxides/sulfides/selenides.

The primary barriers against more widespread acceptance of battery-powered EVs by consumers are that the EV batteries are still too expensive and too heavy. For instance, a well-known all-electric vehicle manufactured in the US operates on an 85 kilo-watt-hour lithium battery system that can run for 320 miles on one battery charge. However, the battery system weights almost 700 kg, occupies the entire chassis of a car, and costs about $15,000 (battery system alone). This battery cost is equivalent to approximately $175/kWh. The US Department of Energy and industry experts believe that the EV industry cannot be economically viable unless the battery cost goes below $100/kWh. Other worldwide government agencies also mandate that the near-term energy density target of an EV battery must exceed 350 Wh/kg, as opposed to the current 250 Wh/kg.

One potential solution to these two closely related problems of current EV battery cells is to significantly increase the specific capacity (mAh/g) or volumetric energy density (mAh/L) of both the anode and cathode active materials with a minimal increase in cost. As shown in FIG. 1(A)-1(C), the element Si has the highest specific capacity (3,850-4,000 mAh/g) for lithium ion storage; phosphorus (P) has a Li storage capacity of 2500 mAh/g. However, phosphorus (P) can store more Li ions per unit volume (2300 $mAh/cm^3$) vs. 2280 $mAh/cm^3$ of Si. More significantly, P has the highest sodium storage capacity (2596 mAh/g) vs. 950 mAh/g of Si. These theoretical data suggest that P is at least as good as Si as a high-capacity anode material for both LIBs and NIBs.

However, P suffers from several severe problems, including poor first-cycle efficiency, rapid capacity decay, and poor electrode integrity. Presumably, these problems stem from the poor electronic conductivity ($1\times10^{-14}$ S/cm), low Li or Na ion diffusivity and conversion rates, and large volume expansion (about 100%) during cycling. The poor conductivity and low ion diffusivity imply the need for a large amount of conductive additive and poor P utilization efficiency. Repeated volume expansion/shrinkage can lead to repeated formation and destruction of SEI (particularly in a NIB and, hence, continued consumption of Na ions and electrolyte), low Coulomb efficiency, fragmentation of P particles, break-away of P particles from the resin binder, and electrode expansion and delamination. All these phenomena could contribute to fast capacity decay.

Phosphorus (particularly red P and black P in amorphous or crystalline form) is a promising anode material for both LIBs and NIBs owning to its high theoretical specific capacity for storing lithium ions and sodium ions (FIGS. 1(A) & (B)), high volumetric lithium ion storage capacity (FIG. 1(C)) and appropriately low redox potential [1-143. However, the poor electronic conductivity and large volume expansion of phosphorus during charge/discharge cycling lead to low electrochemical activity (poor P utilization efficiency), poor first-cycle efficiency, fast capacity decay (low Coulomb efficiency), and electrode expansion and delamination, which have thus far limited its practical application.

Graphene, as a two-dimensional carbon material, exhibits high electric and thermal conductivity, high surface area (theoretically 2630 $m^2/g$), high mechanical flexibility and strength, and good chemical compatibility relative to intended electrode materials and electrolyte. These excellent properties may be put to good use to help address the fast decay issues of phosphorus-based anode active materials. The following list of references summarizes prior art efforts to use graphene as a supporting material:

LIST OF REFERENCES

1. J. X. Song, et al., Chemically bonded phosphorus/graphene hybrid as a high performance anode for sodium-ion batteries, Nano Lett. 14 (2014) 6329-6335.
2. L. K. Pei, et al. Phosphorus nanoparticles encapsulated in graphene scrolls as a high-performance anode for sodium-ion batteries, ChemElectroChem 2 (2015) 1652-1655.
3. C. Zhang, et al., Amorphous phosphorus/nitrogen-doped graphene paper for ultrastable sodium-ion batteries, Nano Lett. 16 (2016) 2054-2060.
4. Y. H. Liu, et al. Red phosphorus nanodots on reduced graphene oxide as a flexible and ultra-fast anode for sodium-ion batteries, ACS Nano 11 (2017) 5530-5537.
5. X. L. Ding, et al., Phosphorus nanoparticles combined with cubic boron nitride and graphene as stable sodium ion battery anodes, Electrochim. Acta 235 (2017) 150-157.
6. G. H. Lee, et al., A reduced graphene oxide-encapsulated phosphorus/carbon composite as a promising anode material for high-performance sodium-ion batteries, J. Mater. Chem. A 5 (2017) 3683-3690.
7. J. Sun, et al., A phosphorene-graphene hybrid material as a high-capacity anode for sodium-ion batteries, Nat. Nanotechnol. 10 (2015) 980-986.

8. Y. Zhang, et al., An air-stable densely packed phosphorene graphene composite toward advanced lithium storage properties, Adv. Energy Mater. 6 (2016) 1600453.
9. Z. X. Yu, et al., Phosphorus graphene nanosheet hybrids as lithium-ion anode with exceptional high-temperature cycling stability, Adv. Sci. 2 (2015) 1400020.
10. L. Chen, et al. Scalable clean exfoliation of high-quality few-layer black phosphorus for a flexible lithium ion battery, Adv. Mater. 28 (2016) 510-517.
11. Y. Y. Zhang, et al., Wet-chemical processing of phosphorus composite nano sheets for high-rate and High-capacity lithium-ion batteries, Adv. Energy Mater. (2016) 1502409.
12. X. Ma, et al. Phosphorus and Nitrogen Dual-Doped Few-Layered Porous Graphene: A High-Performance Anode Material for Lithium-Ion Batteries. ACS Appl. Mater. Interfaces 2014, 6, 14415-14422.
13. Zishuang Yue, et al., "Utilizing a graphene matrix to overcome the intrinsic limitations of red phosphorus as an anode material in lithium-ion batteries," Carbon, V. 127, February 2018, P588-595.

However, these prior studies have fallen short in addressing the major issues associated with using phosphorus-based anode active materials for both LIBs and NIBs.

For instance, Wang's team [1] employed graphene to composite with phosphorus by ball-milling as NIB anodes. They claimed that the graphene served to enhance the overall conductivity and buffer the large volume change of phosphorus during cycling. As a result, the phosphorus/graphene composite showed a high initial capacity of 2077 mAh/g (based on P weight, not composite weight) at 260 mA/g and retained 1700 mAh/g after 60 cycles. Some improvement was achieved through partial encapsulation of phosphorus by graphene scrolls [2]. The synthesis was conducted via co-freeze-drying phosphorus nanoparticles and graphene oxide (GO) nano-sheets, followed by a reduction process. The resulting phosphorus-graphene composite anodes for NIBs showed a reversible capacity of 2355 mA h/g (based on the P weight) with high capacity retention of 92.3% after 150 cycles at a current density of 250 mA/g [2]. Unfortunately, the P content in the composite is only 52%, implying that the actual specific capacity of the anode based on the total composite weight is only 1225 mAh/g (composite weight). Zhang et al. [3] redesigned a novel anode structure by fabricating flexible paper made of nitrogen-doped graphene and amorphous phosphorus. The restructured anode exhibited a stable cyclic performance (0.002% decay per cycle from 2nd to 350th cycle at 800 mA/g). However, such a paper-like structure still allows for direct contact of P material with liquid electrolyte and, hence, does not solve the problem of repeated SEI destruction and formation during cycling of sodium-ion batteries.

Phosphorene, namely monolayer or few-layer black phosphorus (BP), has recently attracted great scientific interest for LIBs/NIBs applications. Phosphorene-graphene hybrid, as an anode for NIBs, has achieved exciting progress. The phosphorene-graphene hybrid material, consisting of a few phosphorene layers sandwiched between graphene layers, delivered a specific capacity of 2440 mAh/g(P) at a current density of 50 mA/g with 83% capacity retention after 100 cycles while operating between 0 and 1.5 V [7]. However, there are still some hurdles before phosphorene as anode material can realize commercialization. A cycling life of slightly above 100 cycles is not acceptable to battery industry.

Another hurdle is the poor air stability of phosphorene which plagues its electrochemical activities. In addition, some side effects are inevitably induced on exfoliated phosphorene. Finally, its high specific surface area can lead to low initial Coulombic efficiency and the low packing efficiency of nanostructures results in low volumetric capacity. To deal with these problems, Zhang et al. [8] prepared densely stacked packed phosphorene-graphene composite (PG-SPS, a packing density of 0.6 g/cm3) via spark plasma sintering. When used for LIBs, PG-SPS electrode showed a much improved initial Coulombic efficiency of 60.2% as compared to phosphorene (11.5%) and loosely stacked phosphorene-graphene (34.3%) electrodes.

These previous studies have provided some hints about the roles of graphene in improving the performance of P-based anode materials. However, these earlier approaches have fallen short in solving the problems such as low first-cycle efficiency (11%-61%, meaning at least 39% of the Li or sodium ions originally stored in the cathode is lost after first charge/discharge cycle) and fast capacity decay. We believe that the problem of fast capacity decay in a NIB is caused by repeated formation and destruction of solid-electrolyte interphase (SEI) during charge/discharge cycling. As the volume of the anode active material and the electrode expand and shrink during cycling, the SEI film which is initially formed on anode material surfaces gets broken, and the fresh surface of anode is exposed to electrolyte, eventually consuming additional $Na^+$ ions and electrolyte to make new SEI film. This new SEI film is destructed again during the next charge/discharge cycle. These repeated reactions result in low coulombic efficiency and continuing capacity deterioration.

In summary, the prior art has not demonstrated a phosphorus material system that has all or most of the properties desired for use as an anode active material in a lithium-ion battery or sodium-ion battery. Thus, there is an urgent and continuing need for a new anode active material that enables a lithium-ion battery or sodium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium-ion or sodium-ion battery containing a phosphorus-based high-capacity anode active material.

SUMMARY

Herein reported is a process for producing a significantly improved anode layer for a lithium-ion battery (LIB) or sodium-ion battery (NIB). Such an anode layer configuration provides not only a robust 3-D network of electron-conducting pathways and high conductivity, but also enables the phosphorus material (a high-capacity anode material) to be readily made into an electrode layer with a high electrode tap density, a sufficiently large electrode thickness (typically 50-500 µm to ensure a sufficient amount of output current), a large weight percentage of phosphorus material (with respect to the total amount of the non-active materials, such as conductive additive and binder, in an electrode and a separate current collector combined), a high utilization efficiency of the phosphorus material, and long-term cycling stability. Both the reversible capacity and the first-cycle efficiency are also significantly improved over those of state-of-the-art phosphorus material-based anode materials.

In certain embodiments, the anode layer comprises multiple particles or coating of a phosphorus material and a solid graphene foam composed of multiple pores and pore walls, wherein the pores have a pore size typically from 2 nm to 20 µm, the pores are preferably interconnected to form an open-cell foam or closed-cell foam, and wherein
(A) the pore walls contain a pristine graphene material having less than 0.01% by weight of non-carbon elements or a non-pristine graphene material having 0.01% to 5% by weight of non-carbon elements, wherein the non-pristine graphene is selected from the group consisting of graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, and combinations thereof;
(B) the phosphorus material is in an amount from 20% to 99% by weight based on the total weight of the solid graphene foam and the phosphorus material combined and the phosphorus material (particles or coating) has a diameter or thickness from 0.5 nm to 10 µm (preferably from 0.5 nm to 1 µm and more preferably from 1 nm to 100 nm) and is selected from red phosphorus, black phosphorus, violet phosphorus, a metal phosphide, $MP_y$, or a combination thereof, wherein M=Mn, V, Sn, Ni, Cu, Fe, Co, Zn, Ge, Se, Mo, Ga, In, or an alloy thereof, and $1 \le y \le 4$; and
(C) some of the multiple pores are lodged with the particles or coating of the phosphorus material (preferably in such a manner that the graphene foam prevents direct physical contact of the phosphorus particles or coating with a liquid component of an electrolyte in the battery). Some pores may be free from any phosphorus material.

It may be noted that the elemental phosphorus (red, black and violet phosphorus) and transition metal phosphide are readily available. These polyphosphides may be synthesized in several ways, including a solid-state method ($FeP_2$, $CoP_3$, $NiP_2$, $PdP_2$ and $CuP_2$) and multiple solvothermal routes ($CoP_3$, $NiP_2$ and $CuP_2$).

In the anode layer, preferably some of multiple pores are free of particles of the phosphorus material, and the solid graphene foam accommodates volume expansion and shrinkage of the particles or coating of the phosphorus material during a battery charge-discharge cycle to avoid significant expansion of the anode layer.

Briefly, the present disclosure provides a new anode layer composition wherein an anode active material (a phosphorus material) is in the form of minute particles that are naturally lodged in the pores or as a thin coating deposited on pore walls of a graphene foam. The presently disclosed graphene foam also exhibits a unique "elastic" property in that the cell walls (solid portion of the foam) can be compressed to tightly embrace anode active material particles when an anode layer is made. When individual phosphorus material particles expand (upon Li or sodium intercalation/conversion), the volume expansion is accommodated by local cell walls, without inducing a volume change of the entire anode layer (hence, not exerting internal pressure to the battery). During the subsequent discharge cycle, these particles shrink; yet the local cell walls shrink or snap back in a congruent manner, maintaining a good contact between cell walls and the particles (remaining capable of accepting $Li^+$ or $Na^+$ ions and electrons during the next charge cycle).

More significantly, the graphene walls prevent the phosphorus material from making direct physical contact with any liquid component of an electrolyte so that there is little or no continued electrochemical decomposition of electrolyte and consumption of lithium/sodium ions and, hence, no rapid decay of the lithium/sodium ion storage capacity of a LIB or NIB.

The solid graphene foam typically has a density from 0.01 to 1.7 g/cm$^3$, a specific surface area from 50 to 2,000 m$^2$/g, a thermal conductivity of at least 100 W/mK per unit of specific gravity, and/or an electrical conductivity no less than 1,000 S/cm per unit of specific gravity.

Preferably, the anode active material (i.e. phosphorus) is in a form of nano-particle, nano-wire, nano-fiber, nano-tube, nano-sheet, nano-belt, nano-ribbon, or nano-coating having a thickness or diameter less than 100 nm. More preferably, the anode active material has a thickness or diameter less than 20 nm.

In a preferred embodiment, the anode layer further comprises a carbon or graphite material therein, wherein the carbon or graphite material is in electronic contact with or deposited onto the phosphorus material. Most preferably, this carbon or graphite material embraces the particles of the phosphorus material and the embraced particles are then lodged in the pores of the graphene foam. The carbon or graphite material may be selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Most preferably, the anode layer further comprises a conductive protective coating, selected from a carbon material, electronically conductive polymer, conductive metal oxide, conductive metal coating, or a lithium ion or sodium ion-conducting material, which is deposited onto or wrapped around the nano-particle, nano-wire, nano-fiber, nano-tube, nano-sheet, nano-belt, nano-ribbon, or nano-coating. The coating can be a lithium ion- or sodium ion-conducting material.

Typically, in the disclosed anode layer, the pore walls contain stacked graphene planes having an inter-plane spacing $d_{002}$ from 0.3354 nm to 0.36 nm as measured by X-ray diffraction. The pore walls can contain a pristine graphene and the solid graphene foam has a density from 0.5 to 1.7 g/cm$^3$ or the pores have a pore size from 2 nm to 200 nm, preferably from 2 nm to 100 nm. Alternatively, the non-pristine graphene material contains a content of non-carbon elements from 0.01% to 2.0% by weight. In one embodiment, the pore walls contain graphene fluoride and the solid graphene foam contains a fluorine content from 0.01% to 2.0% by weight. In another embodiment, the pore walls contain graphene oxide and the solid graphene foam contains an oxygen content from 0.01% to 2.0% by weight. Typically, the non-carbon elements include an element selected from oxygen, fluorine, chlorine, bromine, iodine, nitrogen, hydrogen, or boron Typically, the solid graphene foam has a specific surface area from 200 to 2,000 m$^2$/g or a density from 0.1 to 1.5 g/cm$^3$.

In some embodiments, the anode layer is made from a layer that is a continuous-length roll sheet form having length of at least 2 meters and, preferably, a thickness no greater than 500 µm. This may be produced by a roll-to-roll process.

In a desired embodiment, the graphene foam in the anode layer has an oxygen content or non-carbon content less than 1% by weight, and the pore walls have an inter-graphene spacing less than 0.35 nm, a thermal conductivity of at least 250 W/mK per unit of specific gravity, and/or an electrical conductivity no less than 2,500 S/cm per unit of specific gravity.

In a preferred embodiment, the graphene foam has an oxygen content or non-carbon content less than 0.01% by weight and the pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity. Further preferably, the graphene foam has an oxygen content or non-carbon content no greater than 0.01% by weight and the pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity. Most preferably, the graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

The pore walls may contain stacked graphene planes having an inter-graphene spacing less than 0.337 nm and a mosaic spread value less than 1.0. In an embodiment, the solid graphene foam exhibits a degree of graphitization no less than 80% and/or a mosaic spread value less than 0.4. More preferably, the solid graphene foam exhibits a degree of graphitization no less than 90% and/or a mosaic spread value no greater than 0.4.

Typically, in the disclosed anode layer, the pore walls contain a 3D network of interconnected graphene planes. The graphene foam contains pores having a pore size from 20 nm to 20 µm, but preferably less than 500 nm.

The present disclosure also provides a lithium-ion battery or sodium-ion battery containing the anode or negative electrode as defined above, a cathode or positive electrode, and an electrolyte in ionic contact with the anode and the cathode. A porous separator may be used if the electrolyte contains a liquid or gel electrolyte. This battery (LIB or NIB) can further contain a cathode current collector in electronic contact with the cathode.

In an embodiment, the lithium-ion battery or sodium-ion battery further contains an anode current collector in electronic contact with the anode. Alternatively and more preferably, in the battery, the graphene foam operates as an anode current collector to collect electrons from the anode active material during charging of the battery, which contains no separate or additional current collector.

In a preferred embodiment, the solid graphene foam-protected anode active material is made into a continuous-length roll sheet form (a roll of a continuous foam sheet) having a length of at least 1 meter long, preferably at least 2 meters, further preferably at least 10 meters, and most preferably at least 100 meters. This sheet roll is produced by a roll-to-roll process. There has been no prior art graphene foam that is made into a sheet roll form. It has not been previously found or suggested possible to have a roll-to-roll process for producing a continuous length of graphene foam, either pristine or non-pristine, for the purpose of protecting a phosphorus material.

The presently disclosed anode layer may be produced by a process comprising:
(a) preparing a graphene dispersion having particles of a phosphorus material and sheets of a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent;
(b) dispensing and depositing the graphene dispersion onto a surface of a supporting substrate (e.g. plastic film, rubber sheet, metal foil, glass sheet, paper sheet, etc.) to form a wet layer of graphene-phosphorus material mixture, wherein the dispensing and depositing procedure preferably includes subjecting the graphene dispersion to an orientation-inducing stress;
(c) partially or completely removing the liquid medium from the wet layer of graphene-phosphorus material mixture to form a dried layer of material mixture having a content of non-carbon elements (e.g. O, H, N, B, F, Cl, Br, I, etc.) no less than 5% by weight; and
(d) heat treating the dried layer of material mixture at a first heat treatment temperature from 50° C. to 1,500° C. (more desirably 100° C. to 1,000° C.) at a desired heating rate sufficient to induce volatile gas molecules from the non-carbon elements or to activate the blowing agent for producing the anode layer.

Such a heat treatment in step (d) serves to reduce the content of non-carbon elements (e.g. converting graphene oxide or graphene fluoride to graphene). Such a heat treatment may also act to vaporize the phosphorus material and re-deposit the vapor onto pore walls as a thin coating or ultra-small particles. The thickness or diameter of the re-deposited phosphorus material can be controlled; typically in such a manner that there are a larger number of smaller particles or thinner coating as compared to those prior to vaporization. These smaller active material sizes mean faster diffusion of lithium or sodium ions (shorter diffusion paths), thereby enabling faster charges/discharges of the lithium-ion or sodium-ion battery containing such an anode.

Preferably, the first heat treatment temperature is lower than the vaporization temperature of the phosphorus material (e.g. lower than the sublimation point, 416-590° C., for red phosphorus), allowing some thermal reduction of graphene oxide sheets and liberation of some volatile gas to form pores in the graphene layer. This is followed by heat treating the sample at a second temperature, higher than the vaporization temperature of the phosphorus material, to allow for re-distribution of the phosphorus material vapor and re-deposition of thing coating or fine particles of the phosphorus material on graphene pore walls.

The solid graphene foam in the anode layer typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

This optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

The blowing agent can be a physical blowing agent, a chemical blowing agent, a mixture thereof, a dissolution-and-leaching agent, or a mechanically introduced blowing agent.

The process may further include a step of heat-treating the anode layer at a second heat treatment temperature higher than the first heat treatment temperature for a length of time sufficient for obtaining an anode layer wherein the pore walls contain stacked graphene planes having an inter-plane spacing $d_{002}$ from 0.3354 nm to 0.40 nm and a content of non-carbon elements less than 5% by weight (typically from 0.001% to 2%). When the resulting non-carbon element content is from 0.1% to 2.0% by weight, the inter-plane spacing $d_{002}$ is typically from 0.337 nm to 0.40 nm.

If the original graphene material in the dispersion contains a fraction of non-carbon elements higher than 5% by weight, the graphene material in the solid graphene foam (after the heat treatment) contains structural defects that are induced during the step (d) of heat treating. The liquid medium can be simply water and/or an alcohol, which is environmentally benign.

In a preferred embodiment, the process is a roll-to-roll process wherein steps (b) and (c) include feeding the supporting substrate from a feeder roller to a deposition zone, continuously or intermittently depositing the graphene dispersion onto a surface of the supporting substrate to form the wet layer thereon, drying the wet layer to form the dried layer of material mixture, and collecting the dried layer of material mixture deposited on the supporting substrate on a collector roller. Such a roll-to-roll or reel-to-reel process is a truly industrial-scale, massive manufacturing process that can be automated.

In one embodiment, the first heat treatment temperature is from 100° C. to 1,500° C. and the second heat treatment temperature is higher than the first heat treatment temperature (but not higher than 1,500° C. provided elemental phosphorus is used as the anode active material). In another embodiment, the second heat treatment temperature includes at least a temperature selected from (A) 1,500-2,100° C. or (B) 2,100-3,200° C., provided the transition metal phosphide is used as the active anode material. In a specific embodiment, the heat treatments includes a first temperature in the range from 300-1,500° C. for at least 1 hour (typically 1-24 hours and more typically 1-12 hours) and then a second temperature in the range from 1,500-2,500° C. for at least 0.5 hours (typically 1-3 hours).

There are several surprising results of conducting first and/or second heat treatments to the dried graphene-phosphorus material mixture layer, and different heat treatment temperature ranges enable us to achieve different purposes, such as (a) removal of non-carbon elements from the graphene material (e.g. thermal reduction of fluorinated graphene to obtain graphene or reduced graphene fluoride, RGF) which generate volatile gases to produce pores or cells in a graphene material, (b) activation of the chemical or physical blowing agent to produce pores or cells, (c) chemical merging or linking of graphene sheets to significantly increase the lateral dimension of graphene sheets in the foam walls (solid portion of the foam), (d) healing of defects created during fluorination, oxidation, or nitrogenation of graphene planes in a graphite particle, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between graphene sheets, often in an edge-to-edge manner (some in face-to-face manner).

In one embodiment, the solid graphene foam, minus the anode active material (phosphorus material), has a specific surface area from 200 to 2,000 m$^2$/g. In one embodiment, the solid graphene foam has a density from 0.1 to 1.5 g/cm$^3$. In an embodiment, step (d) of heat treating the dried layer of graphene-phosphorus material mixture at a first heat treatment temperature is conducted under a compressive stress. In another embodiment, the process comprises a compression step to reduce a thickness, pore size, or porosity level of the sheet of graphene foam. In battery cells, the anode layer typically has a thickness from 10 μm to 300 μm, more typically from 50 μm to 200 μm.

In an embodiment, the graphene dispersion has at least 3% by weight of graphene oxide dispersed in the liquid medium to form a liquid crystal phase. In another embodiment, the graphene dispersion contains a graphene oxide dispersion prepared by immersing a graphitic material in a powder or fibrous form in an oxidizing liquid in a reaction vessel at a reaction temperature for a length of time sufficient to obtain the graphene dispersion wherein the graphitic material is selected from natural graphite, artificial graphite, meso-phase carbon, meso-phase pitch, meso-carbon microbead, soft carbon, hard carbon, coke, carbon fiber, carbon nano-fiber, carbon nano-tube, or a combination thereof and wherein the graphene oxide has an oxygen content no less than 5% by weight.

In an embodiment, the first heat treatment temperature contains a temperature in the range from 50° C.-300° C. and, as a result, the graphene foam has an oxygen content or non-carbon element content less than 5%, and the pore walls have an inter-graphene spacing less than 0.40 nm, a thermal conductivity of at least 150 W/mK (more typically at least 200 W/mk) per unit of specific gravity, and/or an electrical conductivity no less than 2,000 S/cm per unit of specific gravity.

In a preferred embodiment, the first and/or second heat treatment temperature contains a temperature in the range from 300° C.-1,500° C. and, as a result, the graphene foam has an oxygen content or non-carbon content less than 1%, and the pore walls have an inter-graphene spacing less than 0.35 nm, a thermal conductivity of at least 250 W/mK per unit of specific gravity, and/or an electrical conductivity no less than 2,500 S/cm per unit of specific gravity.

When the first and/or second heat treatment temperature contains a temperature in the range from 1,500° C.-2,100° C., the graphene foam has an oxygen content or non-carbon content less than 0.01% and pore walls have an inter-graphene spacing less than 0.34 nm, a thermal conductivity of at least 300 W/mK per unit of specific gravity, and/or an electrical conductivity no less than 3,000 S/cm per unit of specific gravity.

When the first and/or second heat treatment temperature contains a temperature greater than 2,100° C., the graphene foam has an oxygen content or non-carbon content no greater than 0.001% and pore walls have an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

If the first and/or second heat treatment temperature contains a temperature no less than 2,500° C., the graphene foam has pore walls containing stacked graphene planes having an inter-graphene spacing less than 0.336 nm, a mosaic spread value no greater than 0.4, and a thermal conductivity greater than 400 W/mK per unit of specific gravity, and/or an electrical conductivity greater than 4,000 S/cm per unit of specific gravity.

In one embodiment, the pore walls contain stacked graphene planes having an inter-graphene spacing less than 0.337 nm and a mosaic spread value less than 1.0. In another embodiment, the solid wall portion of the graphene foam exhibits a degree of graphitization no less than 80% and/or a mosaic spread value less than 0.4. In yet another embodiment, the solid wall portion of the graphene foam exhibits a degree of graphitization no less than 90% and/or a mosaic spread value no greater than 0.4.

Typically, the pore walls contain a 3D network of interconnected graphene planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 200 nm, more typically from 1 nm to 100 nm, further more typically from 1 nm to 40 nm, and most typically from 1 nm to 30 nm.

Preferably, the solid graphene foam contains pores having a pore size from 2 nm to 10 μm (preferably 2 nm to 500 nm and more preferably from 2 nm to 200 nm). It may be noted that it has not been possible to use Ni-catalyzed CVD to produce graphene foams having a pore size range of 2-200 nm. This is due to the notion that it has not been proven possible to prepare Ni foam templates having such a pore size range and not possible for the hydrocarbon gas (precursor molecules) to readily enter Ni foam pores of these sizes. These Ni foam pores must also be interconnected. Additionally, the sacrificial plastic colloidal particle approaches have resulted in macro-pores that are in the size range of microns to millimeters.

In a preferred embodiment, the present disclosure provides a roll-to-roll process for producing an anode layer composed of an anode active material and a solid graphene foam, which is composed of multiple pores and pore walls. The process comprises: (a) preparing a graphene dispersion having a phosphorus material and a graphene material dispersed in a liquid medium, wherein the dispersion optionally contains a blowing agent; (b) continuously or intermittently dispensing and depositing the graphene dispersion onto a surface of a supporting substrate to form a wet layer of graphene-phosphorus material mixture, wherein the supporting substrate is a continuous thin film supplied from a feeder roller and collected on a collector roller; (c) partially or completely removing the liquid medium from the wet layer to form a dried layer of material mixture; and (d) heat treating the dried layer of material mixture at a first heat treatment temperature from 50° C. to 1,500° C. at a desired heating rate sufficient to activate the blowing agent for producing said solid graphene foam having a density from 0.01 to 1.7 g/cm³ or a specific surface area from 50 to 3,000 m²/g.

The orientation-inducing stress may be a shear stress. As an example, an effective orientation-inducing stress is created in an automated roll-to-roll coating process in which a "knife-on-roll" configuration dispenses the graphene dispersion over a moving solid substrate, such as a plastic film. The relative motion between this moving film and the coating knife acts to effect orientation of graphene sheets along the shear stress direction.

This orientation-inducing stress is a critically important step in the production of the presently disclosed graphene foams due to the surprising observation that the shear stress enables the graphene sheets to align along a particular direction (e.g. X-direction or length-direction) to produce preferred orientations and facilitate contacts between graphene sheets along foam walls. Further surprisingly, these preferred orientations and improved graphene-to-graphene contacts facilitate chemical merging or linking between graphene sheets during the subsequent heat treatment of the dried graphene layer. Such preferred orientations and improved contacts are essential to the eventual attainment of exceptionally high thermal conductivity, electrical conductivity, elastic modulus, and mechanical strength of the resulting graphene foam. In general, these great properties could not be obtained without such a shear stress-induced orientation control.

The present disclosure also provides a process for producing the anode layer, the process comprising: (a) preparing a graphene oxide dispersion having multiple particles of the phosphorus material and multiple sheets of graphene oxide sheets dispersed in a water or water-alcohol mixture; (b) sealing the graphene oxide dispersion in an autoclave and subjecting the dispersion to a hydrothermal treatment at a pressure from 1.1 atm to 100 atm and a temperature from 50° C. to 500° C. for a period of time sufficient to produce graphene foam having the phosphorus material residing in pores of the graphene foam; and (c) removing water or water-alcohol mixture from the graphene foam to produce the anode material.

DESCRIPTION OF THE PREFERRED EMBODIMENTS

This disclosure is directed at the anode layer (negative electrode layer) containing a layer of graphene foam having a phosphorus-based anode active material residing in pores of this graphene foam for a lithium-ion battery (LIB) or a sodium-ion battery (NIB). The LIB or NIB is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration.

Figure 4A:
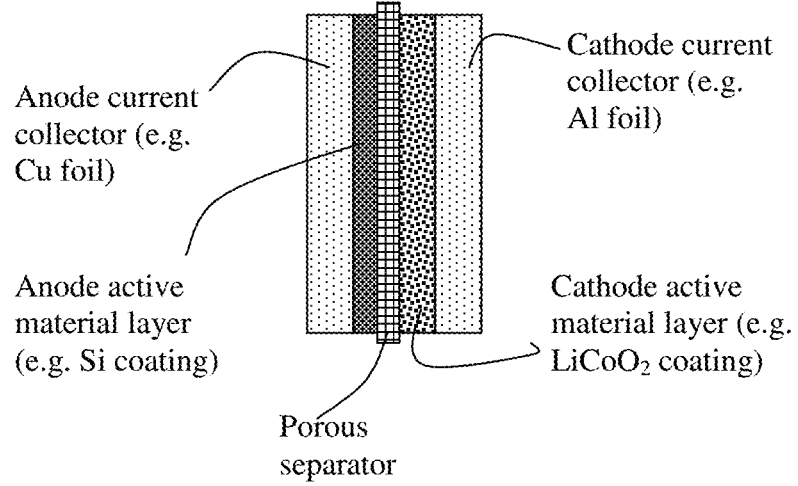
FIG. 4(A) schematic of a prior art lithium-ion or sodium-ion battery cell, wherein the anode layer is a thin coating of an anode active material itself (e.g. a CVD Si coating)
Figure 4B:
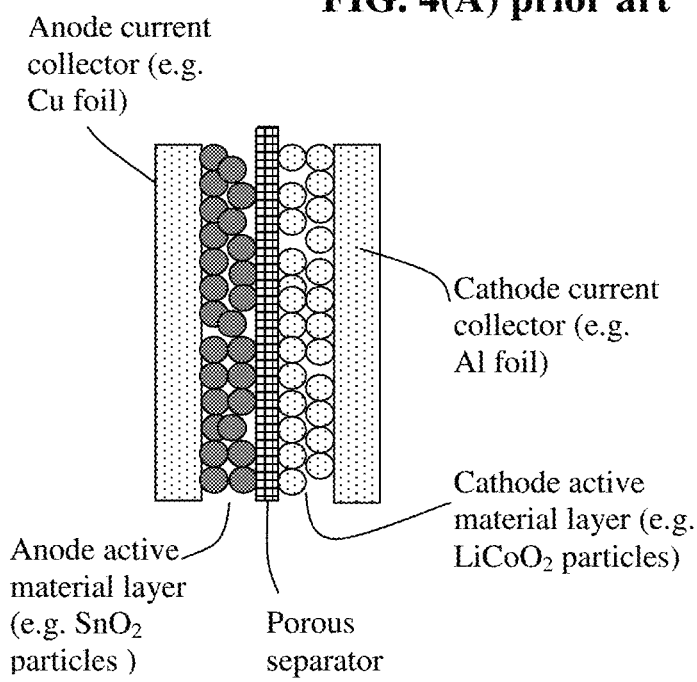
FIG. 4(B) schematic of another lithium-ion or sodium-ion battery; the anode layer being composed of particles of an anode active material, a conductive additive (not shown) and a resin binder (not shown).

As illustrated in FIGS. 4(A) and 4(B), a LIB or NIB is typically composed of an anode current collector (e.g. Cu foil), an anode or negative electrode (anode layer containing an anode active material, conductive additive, and binder), a porous separator and/or an electrolyte component, a cathode electrode (cathode active material, conductive additive, and resin binder), and a cathode current collector (e.g. Al foil). In a more commonly used cell configuration (FIG. 4(B)), the anode layer is composed of particles of an anode active material (e.g. graphite, hard carbon, Sn, or Si), a conductive additive (e.g. carbon black particles), and a resin binder (e.g. SBR or PVDF). This anode layer is typically 50-300 µm thick (more typically 100-200 µm) to give rise to a sufficient amount of current per unit electrode area. This thickness range is an industry-accepted constraint under which a battery designer must work. This constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <<100 µm) does not contain a sufficient amount of an active lithium storage material (hence, insufficient current output); and (c) all non-active material layers in a battery cell (e.g. current collectors, conductive additive, binder resin, and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 4(A), the anode active material is deposited in a thin film form directly onto an anode current collector, such as a sheet of copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking. Such a constraint further diminishes the total lithium storage capacity and the lithium storage capacity per unit electrode surface area. Such a thin-film battery has very limited scope of application. On the other hand, a Si layer thicker than 100 nm has been found to exhibit poor cracking resistance during battery charge/discharge cycles. It takes but a few cycles to get such a thick film fragmented. A desirable electrode thickness is at least 100 µm. These thin-film electrodes (with a thickness <100 nm) fall short of the required thickness by three (3) orders of magnitude. As a further problem, Si and $SnO_2$ film-based anode layers cannot be too thick either since these materials are not conductive to both electrons and lithium/sodium ions and, thus, a large layer thickness implies an excessively high internal resistance.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the graphene foam-protected phosphorus material.

The present disclosure provides an anode layer containing (A) a layer of solid graphene foam composed of multiple pores and pore walls and (B) a phosphorus material in the form of minute particles or thin coating residing in some of these pores (coating may be deposited on pore walls); some pores remaining unoccupied, acting to cushion volume expansion of phosphorus material. The disclosure also provides a process for producing such an anode layer. The phosphorus material may be selected from red phosphorus, black phosphorus, violet phosphorus, a metal phosphide, $MP_y$, or a combination thereof, wherein M=Mn, V, Sn, Ni, Cu, Fe, Co, Zn, Ge, Se, Mo, Ga, In, or an alloy thereof, and $1 \leq y \leq 4$.

More specifically, the presently disclosed anode or negative electrode layer comprises particles or coating of a phosphorus material embedded in pores of a solid graphene foam, which is composed of multiple pores and pore walls (solid portion of the graphene foam), wherein (a) the pore walls contain a pristine graphene material having essentially zero % of non-carbon elements or a non-pristine graphene material having 0.001% to 5% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; (b) the phosphorus material is in an amount from 20% to 99% by weight (preferably from 50% to 95% by weight and more preferably from 70% to 95% by weight) based on the total weight of the graphene foam and the phosphorus material combined; and (c) the pores are lodged with the particles or coating of the phosphorus material. The bonded graphene planes in the foam walls produced by the presently disclosed process are found to be capable of elastically deforming to the extent that is responsive to the expansion and shrinkage of the phosphorus material particles.

The solid graphene foam typically has a density from 0.01 to 1.7 $g/cm^3$, (more typically from 0.05 to 1.6 $g/cm^3$, further more typically from 0.1 to 1.5 $g/cm^3$, and more desirably from 0.5 to 0.01 to 1.3 $g/cm^3$), a specific surface area from 50 to 2,000 $m^2/g$, a thermal conductivity of at least 100 W/mK per unit of specific gravity, and/or an electrical conductivity no less than 1,000 S/cm per unit of specific gravity. It may be noted that these ranges of physical densities are not arbitrarily selected ranges. On the one hand, these densities are designed so that the internal pore amount (level of porosity) is sufficiently large to accommodate the maximum amount of phosphorus material. On the other hand, the pore amount cannot be too large (or physical density being too low); otherwise, the pore walls of the graphene foam structure cannot be sufficiently elastic (or, not capable of undergoing a large deformation that is fully recoverable or reversible) and strong for electrode fabrication.

Ideally, the pores should expand to the same extent as the embraced anode active material particle does; and should shrink back to the same extent as the anode active material particle. In other words, the graphene foam walls must be fully elastic to meet such a requirement. This is a most challenging task; but, we have surprisingly observed that good elasticity of graphene foam can be achieved with sufficiently long/wide graphene planes (length/width of graphene planes larger than pore diameters) and a sufficient amount (5%-50% of total pore volumes) of small pores (2-100 nm) that are not occupied by an anode active material particle. The total pore volume (small pores+large pores, etc.) may be denoted as $V_2$, and the phosphorus material has a total volume $V_1$, wherein the $V_2/V_1$ ratio is preferably from 0.5 to 3.5.

The pores may further contain therein particles of natural graphite, artificial graphite, or other anode active materials (e.g. Si, SiO, Sn, $SnO_2$, Ge, and $Li_4Ti_5O_{12}$, etc.). The particles of the phosphorus material may be in the form of a nano-particle, nano-wire, nano-fiber, nano-tube, nano-sheet, nano-belt, nano-ribbon, or nano-coating. Preferably, these anode active material particles and/or phosphorus material particles are embraced by an electron-conducting and/or lithium or sodium ion-conducting coating, such as an amorphous carbon produced by chemical vapor deposition (CVD) or pyrolization of a resin.

Briefly, the process for producing the disclosed anode layer comprises the following steps:

(a) preparing a graphene dispersion having particles of an anode active material (containing a phosphorus material) and graphene sheets dispersed in a liquid medium, wherein graphene sheets are selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0/1.0 to 1.0/1.0 (this blowing agent is normally required if the graphene material is pristine graphene, typically having a blowing agent-to-pristine graphene weight ratio from 0.01/1.0 to 1.0/1.0);

(b) dispensing and depositing the graphene dispersion onto a surface of a supporting substrate (e.g. plastic film, rubber sheet, metal foil, glass sheet, paper sheet, etc.) to form a wet layer of graphene-anode material mixture, wherein the dispensing and depositing procedure (e.g. coating or casting) preferably includes subjecting the graphene dispersion to an orientation-inducing stress;

(c) partially or completely removing the liquid medium from the wet layer of graphene material to form a dried layer of material mixture; (The graphene sheets preferably have a content of non-carbon elements (e.g. O, H, N, B, F, Cl, Br, I, etc.) no less than 5% by weight. This non-carbon content, when being removed via heat-induced decomposition, produces volatile gases that act as a foaming agent or blowing agent); and (d) heat treating the dried layer of material mixture at a first heat treatment temperature from 50° C. to 1,500° C. at a desired heating rate sufficient to generate volatile gas molecules from the non-carbon elements in the graphene material or to activate the blowing agent for producing the solid graphene foam.

The pores in the graphene foam are formed slightly before, during, or after sheets of a graphene material are (1) chemically linked/merged together (edge-to-edge and/or face-to-face) typically at a temperature from 50 to 1,500° C. and/or (2) re-organized into larger graphite crystals or domains (herein referred to as re-graphitization) along the pore walls at a high temperature (typically >2,100° C. and more typically >2,500° C.). It may be noted that the particles of the anode active material may be in the form of small particulate, wire, rod, sheet, platelet, ribbon, tube, etc. with a size of <20 µm (preferably <10 µm, more preferably <5 µm, further preferably <1 µm, still more preferably <300 nm, and most preferably <100 nm). These particles are naturally embraced by graphene-containing pore walls in the foam structure. Hence, where particles are present, there are pores in the graphene foam. However, there are additional pores that are formed due to the evolution of volatile gases (from a blowing agent and/or non-carbon elements, such as —OH, —F, etc.) during the heat treatment of the dried graphene layer. These pores play the role of cushioning the local volume expansion of anode particles, thereby avoiding global expansion of the resulting anode layer. The ability of the pore walls to snap back according to the shrinkage extent of the anode particles comes from the surrounding graphene sheets that are bonded and joint to form larger and stronger graphene planes during heat treatments.

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been taught or hinted that an aggregate of sheets of a graphene material can be converted into a graphene foam via a blowing agent. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Figure 1A:
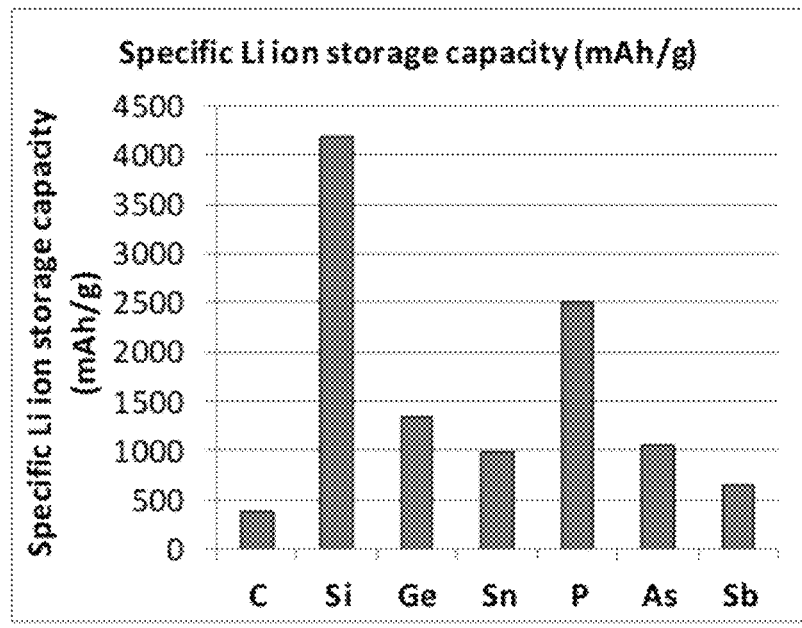
FIG. 1(A) The specific lithium ion storage capacity values (mAh/g) of select anode active materials (elements)
Figure 1B:
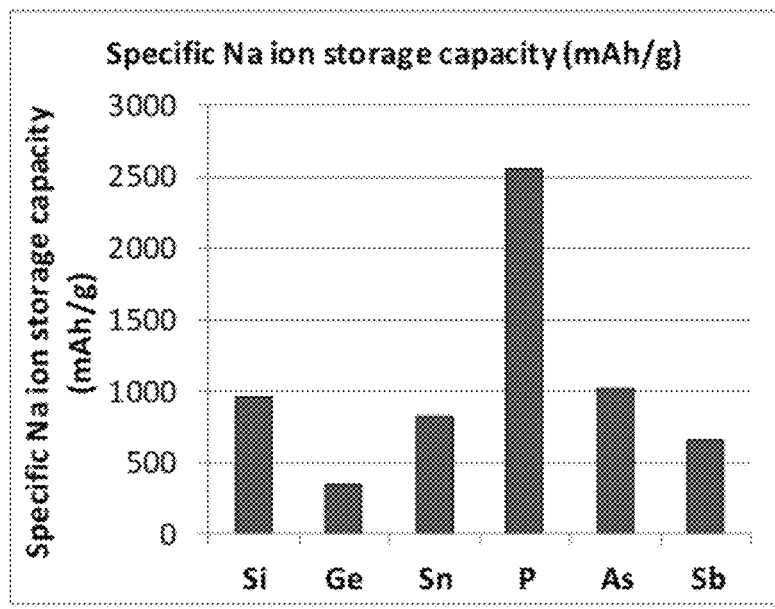
FIG. 1(B) The specific sodium ion storage capacity values (mAh/g) of select anode active materials.
Figure 1C:
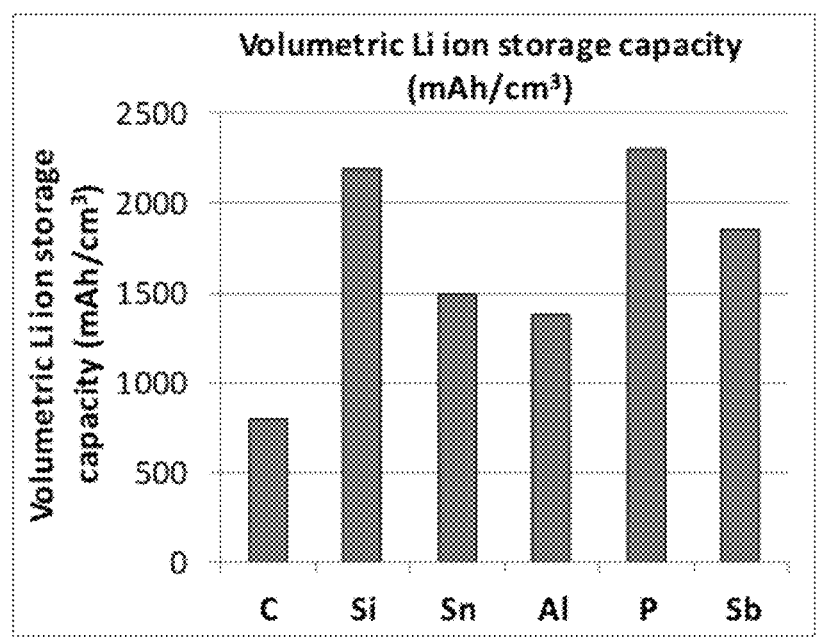
FIG. 1(C) The volumetric lithium ion storage capacity values (mAh/cm³) of select anode active materials.
Figure 2:
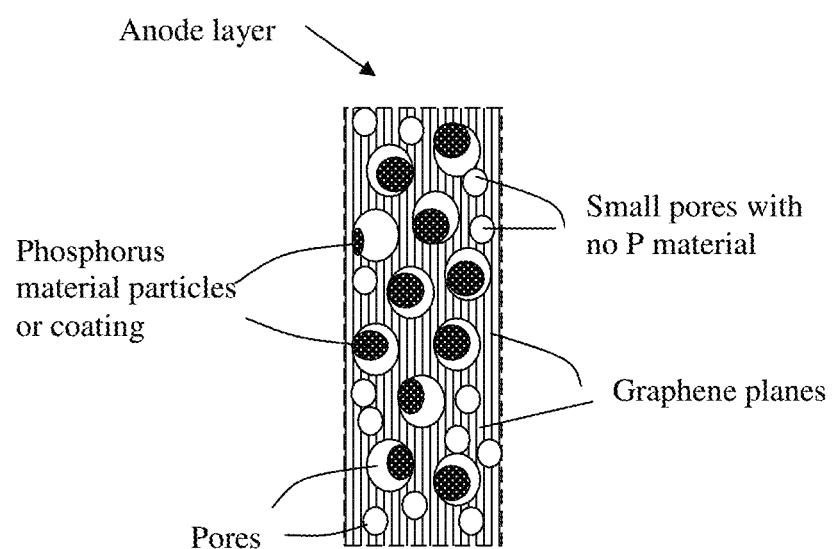
FIG. 2 Schematic of a layer of graphene foam-protected phosphorus material according to an embodiment of the present disclosure.
Figure 3:
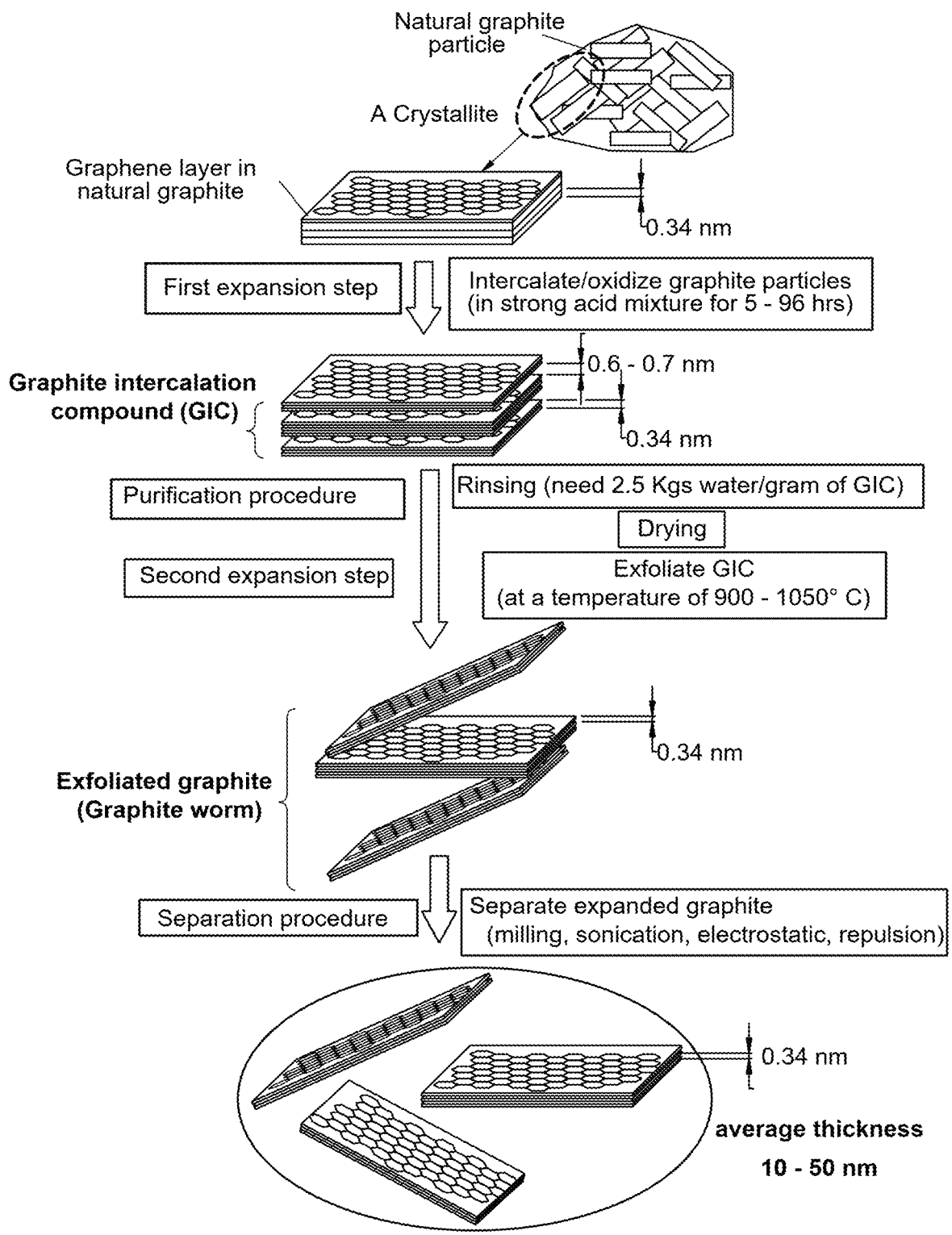
FIG. 3 A flow chart showing the most commonly used prior art process of producing highly oxidized graphene sheets (or nano graphene platelets, NGPs) that entails chemical oxidation/intercalation, rinsing, and high-temperature exfoliation procedures.

For instance, as illustrated in FIG. 3, graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles, upon washing and drying, may then be subjected to thermal exfoliation to produce GO sheets. In the presently disclosed process, GO sheets dispersed in water may be subjected to ultrasonication to form a GO suspension which contains GO sheets or molecules dispersed in water. Particles of a phosphorus material are then added into the suspension.

The GO suspension may then be cast or coated on a solid substrate surface to prepare a wet GO film, which is then dried and heat-treated at a first heat treatment temperature typically selected from 50 to 1,500° C. to make a graphene oxide foam containing pores lodged with phosphorus material particles. For red phosphorus, for instance, this first heat treatment temperature is preferably from 100 to 500° C. The foam may then be heat treated at a second temperature, preferably above the vaporization or sublimation temperature of the phosphorus material to vaporize the phosphorus material and re-distribute and deposit the phosphorus material uniformly on pore wall (graphene) surfaces.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension. Particles of a phosphorus material and an optional chemical blowing agent are then dispersed into the dispersion. This suspension is then cast or coated onto the surface of a solid substrate (e.g. glass sheet or Al foil). When heated to a desired temperature (first heat treatment temperature), the chemical blowing agent is activated or decomposed to generate volatile gases (e.g. $N_2$ or $CO_2$), which act to form bubbles or pores in an otherwise mass of solid graphene sheets, forming a pristine graphene foam. Particles of the phosphorus material naturally reside in pores of the graphene foam. The foam may then be heat treated at a second temperature, preferably above the vaporization or sublimation temperature of the phosphorus material to vaporize the phosphorus material and re-distribute and deposit the phosphorus material uniformly on pore wall (graphene) surfaces Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The pore walls (cell walls or solid graphene portion) in the graphene foam of the presently disclosed anode layer contain chemically bonded and merged graphene planes. These planar aromatic molecules or graphene planes (hexagonal structured carbon atoms) are well interconnected physically and chemically. The lateral dimensions (length or width) of these planes are huge (e.g. from 20 nm to >10 μm), typically several times or even orders of magnitude larger than the maximum crystallite dimension (or maximum constituent graphene plane dimension) of the starting graphite particles prior to oxidation or intercalation. The graphene sheets or planes are essentially merged and/or interconnected to form electron-conducting pathways with low resistance. This is a unique and new class of material that has not been previously discovered, developed, or suggested to possibly exist.

In order to illustrate how the presently disclosed process works to produce a graphene foam-protected P-based anode layer, we herein make use of graphene oxide (GO) and graphene fluoride (GF) as two examples. These should not be construed as limiting the scope of our claims. In each case, the first step involves preparation of a graphene dispersion (e.g. GO+water or GF+organic solvent, DMF) containing an optional blowing agent. If the graphene material is pristine graphene containing no non-carbon elements, a blowing agent may be required. Particles of a phosphorus material are then added into the suspension, followed by a foaming procedure.

In step (b), the GF or GO suspension containing particles of a desired phosphorus material) is formed into a wet GF or GO layer on a solid substrate surface (e.g. PET film or glass) preferably under the influence of a shear stress. One example of such a shearing procedure is casting or coating a thin film of GF or GO suspension using a coating machine. This procedure is similar to a layer of varnish, paint, coating, or ink being coated onto a solid substrate. The roller or wiper creates a shear stress when the film is shaped, or when there is a relative motion between the roller/wiper and the supporting substrate. Quite unexpectedly and significantly, such a shearing action enables the planar GF or GO sheets to well align along, for instance, a shearing direction. Further surprisingly, such a molecular alignment state or preferred orientation is not disrupted when the liquid components in the GF or GO suspension are subsequently removed to form a well-packed layer of highly aligned GF or GO sheets that are at least partially dried. The dried GF or GO mass has a high birefringence coefficient between an in-plane direction and the normal-to-plane direction.

In an embodiment, this GF or GO layer, each containing a phosphorus material therein (comprising niobium-containing composite metal oxide or its precursor species), is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene material, pushing solid graphene sheets into a foam wall structure, forming a graphene oxide foam. If no blowing agent is added, the non-carbon elements in the graphene material preferably occupy at least 10% by weight of the graphene material (preferably at least 20%, and further preferably at least 30%). The first (initial) heat treatment temperature is typically greater than 50° C., preferably greater than 100° C., more preferably greater than 300° C., and can be as high as 1,500° C. The blowing agent is typically activated at a temperature from 50° C. to 300° C., but can be higher. The foaming procedure (formation of pores, cells, or bubbles) is typically completed within the temperature range of 50-1,500° C. Quite surprisingly, the chemical linking or merging between graphene planes (GO or GF planes) in an edge-to-edge and face-to-face manner can occur at a relatively low heat treatment temperature (e.g. even as low as from 150 to 300° C.).

The foamed graphene material may be subjected to a further heat treatment that involves at least a second temperature that is higher than the first heat treatment temperature. It is again noted that if the phosphorus material residing in the pores of the graphene foam contains only transition metal phosphide (not elemental phosphorus) as the anode active material, the second heat treatment temperature can be significantly higher than 1,500° C. However, if elemental phosphorus resides in graphene foam pores, the heat treatment temperature should not exceed 1000° C., preferably lower than 700° C.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried graphene layer experiences may be divided into four distinct HTT regimes:

Regime 1 (50° C. to 300° C.): In this temperature range (the thermal reduction regime and also the activation regime for a blowing agent, if present), a GO or GF layer primarily undergoes thermally-induced reduction reactions, leading to a reduction of oxygen content or fluorine content from typically 20-50% (of O in GO) or 10-25% (of F in GF) to approximately 5-6%. This treatment results in a reduction of inter-graphene spacing in foam walls from approximately 0.6-1.2 nm (as dried) down to approximately 0.4 nm, and an increase in thermal conductivity to 200 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between graphene sheets occurs. The inter-GO or inter-GF planar spacing remains relatively large (0.4 nm or larger). Many O- or F-containing functional groups survive.

Regime 2 (300° C.-1,500° C.): In this chemical linking regime, extensive chemical combination, polymerization, and cross-linking between adjacent GO or GF sheets occur. The oxygen or fluorine content is reduced to typically <1.0% (e.g. 0.7%) after chemical linking, resulting in a reduction of inter-graphene spacing to approximately 0.345 nm. This implies that some initial re-graphitization has already begun at such a low temperature, in stark contrast to conventional graphitizable materials (such as carbonized polyimide film) that typically require a temperature as high as 2,500° C. to initiate graphitization. This is another distinct feature of the presently disclosed graphene foam and its production processes. These chemical linking reactions result in an increase in thermal conductivity to 250 W/mK per unit of specific gravity, and/or electrical conductivity to 2,500-4,000 S/cm per unit of specific gravity.

Regime 3 (1,500-2,500° C.): In this ordering and re-graphitization regime, extensive graphitization or graphene plane merging occurs, leading to significantly improved degree of structural ordering in the foam walls. As a result, the oxygen or fluorine content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains in the foam walls, which can be orders of magnitude larger than the original grain sizes of the starting graphite particles for the production of GO or GF. The oxygen or fluorine content is essentially eliminated, typically 0%-0.001% by weight. The inter-graphene spacing is reduced to down to approximately 0.3354 nm (degree of graphitization from 80% to nearly 100%), corresponding to that of a perfect graphite single crystal. The foamed structure thus obtained exhibits a thermal conductivity of >400 W/mK per unit of specific gravity, and electrical conductivity of >4,000 S/cm per unit of specific gravity.

The presently disclosed graphene foam structure containing an anode active material therein can be obtained by heat-treating the dried GO or GF layer with a temperature program that covers at least the first regime (typically requiring 1-4 hours in this temperature range if the temperature never exceeds 500° C.) and more commonly covers the first two regimes (1-2 hours preferred). If a higher thermal conductivity or electrical conductivity is desired, heat treatments may follow the first three regimes (preferably 0.5-2.0 hours in Regime 3), and can cover all the 4 regimes (including Regime 4 for 0.2 to 1 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

It is believed that neighboring GO molecules in the dried GO layer can be chemically linked together to form a foam wall. Chemical linking could also occur face-to-face, not just edge-to-edge for GO, GF, and chemically functionalized graphene sheets. These linking and merging reactions proceed in such a manner that the molecules are chemically merged, linked, and integrated into one single entity. The graphene sheets (GO or GF sheets) completely lose their own original identity and they no longer are discrete sheets/platelets/flakes. The resulting product is not a simple aggregate of individual graphene sheets, but a single entity that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if the HTT is sufficiently high (e.g. >1,500° C. or much higher), these graphene planes are essentially bonded together with one another. The graphene foam of the presently disclosed anode layer has the following unique and novel features that have never been previously taught or hinted:

(1) In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 μm, and, in many cases, >>10 μm, or even >>100 μm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and sp³ (weak but existing) electronic configurations, not just the conventional sp² in graphite.

(2) This graphene foam wall is not made by gluing or bonding discrete flakes/platelets together with a resin binder, linker, or adhesive. Instead, GO sheets (molecules) from the GO dispersion or the GF sheets from the GF dispersion are merged through joining or forming of covalent bonds with one another, into an integrated graphene entity, without using any externally added linker or binder molecules or polymers. For a lithium battery featuring such an anode layer, there is no need to have non-active materials, such as a resin binder or a conductive additive, which are incapable of storing lithium. This implies a reduced amount of non-active materials or increased amount of active materials (i.e. phosphorus material) in the anode, effectively increasing the specific capacity per total anode weight, mAh/g (of composite).

(3) The graphene foam walls are typically a poly-crystal composed of large grains having incomplete grain boundaries. This entity is derived from a GO or GF suspension, which is in turn obtained from natural graphite or artificial graphite particles originally having multiple graphite crystallites. Prior to being chemically oxidized or fluorinated, these starting graphite crystallites have an initial length ($L_a$ in the crystallographic a-axis direction), initial width ($L_b$ in the b-axis direction), and thickness ($L_c$ in the c-axis direction). Upon oxidation or fluorination, these initially discrete graphite particles are chemically transformed into highly aromatic graphene oxide or graphene fluoride molecules having a significant concentration of edge- or surface-borne functional groups (e.g. —F, —OH, —COOH, etc.). These aromatic GO or GF molecules in the suspension have lost their original identity of being part of a graphite particle or flake. Upon removal of the liquid component from the suspension, the resulting GO or GF molecules form an essentially amorphous structure. Upon heat treatments, these GO or GF molecules are chemically merged and linked into a unitary or monolithic graphene entity that constitutes the foam wall. This foam wall is highly ordered.

The resulting unitary graphene entity in the foam wall typically has a length or width significantly greater than the $L_a$ and $L_b$ of the original crystallites. The length/width of this graphene foam wall entity is significantly greater than the $L_a$ and $L_b$ of the original crystallites. Even the individual grains in a poly-crystalline graphene wall structure have a length or width significantly greater than the $L_a$ and $L_b$ of the original crystallites.

(4) The large length and width of the graphene planes enable the foam walls to be of high mechanical strength and elasticity. In comparative experiments, we observe that without this feature (i.e. no chemical merging of graphene planes), conventionally made graphene foams composed of aggregates of discrete graphene sheets, are very weak, fragile, and non-elastic (deformation not reversible); foam walls being easily collapsed or broken.

(5) Due to these unique chemical composition (including oxygen or fluorine content), morphology, crystal structure (including inter-graphene spacing), and structural features (e.g. high degree of orientations, few defects, incomplete grain boundaries, chemical bonding and no gap between graphene sheets, and substantially no interruptions in graphene planes), the GO- or GF-derived graphene foam has a unique combination of outstanding thermal conductivity, electrical conductivity, mechanical strength, and stiffness (elastic modulus).

The aforementioned features are further described and explained in detail as follows: As illustrated in FIG. 3, a graphite particle is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). Different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite are intercalated in an acid solution to produce graphite intercalation compounds (GICs). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite") having a typical density of about 0.04-2.0 g/cm³ for most applications.

The processes for fabricating flexible graphite foils typically begin with intercalating graphite particles (e.g., natural graphite or synthetic graphite) with an intercalant (typically a strong acid or acid mixture) to obtain a graphite intercalation compound (GIC). After rinsing in water to remove excess acid, the GIC becomes "expandable graphite." The GIC or expandable graphite is then exposed to a high temperature environment (e.g., in a tube furnace preset at a temperature in the range from 800-1,050° C.) for a short duration of time (typically from 15 seconds to 2 minutes).

This thermal treatment allows the graphite to expand in its c-axis direction by a factor of 30 to several hundreds to obtain a worm-like vermicular structure (graphite worm), which contains exfoliated, but un-separated graphite flakes with large pores interposed between these interconnected flakes.

In one prior art process, the exfoliated graphite (or mass of graphite worms) is re-compressed by using a calendaring or roll-pressing technique to obtain flexible graphite foils, which are typically 100-300 µm thick. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene. An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide (2-10 layers) may be made into a graphene film/paper using a film- or paper-making process.

Further alternatively, with a low-intensity shearing, graphite worms tend to be separated into the so-called expanded graphite flakes having a thickness >100 nm. These flakes can be formed into graphite paper or mat using a paper- or mat-making process. This expanded graphite paper or mat is just a simple aggregate or stack of discrete flakes having defects, interruptions, and mis-orientations between these discrete flakes.

The present disclosure also provides a lithium-ion battery (LIB) or sodium-ion battery (NIB) comprising the aforementioned anode layer of graphene foam-protected P-based material, a cathode, an electrolyte in physical contact with both the anode and the cathode, and an optional separator disposed between the anode and the cathode.

There is no limitation on the type of cathode active materials that can be used to pair up with the presently disclosed anode active materials. There is also no limitation on what type of electrolyte and separator that can be used. The electrolyte can be an organic, ionic liquid, polymer gel, solid polymer, quasi-solid, solid state electrolyte, or a combination thereof. The separator can be porous polymer membrane, fibril-based membrane, ceramic-coated membrane, etc.

For instance, the cathode active material layer for a LIB may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material as a cathode active material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The following examples serve to provide the best modes of practice for the present disclosure and should not be construed as limiting the scope of the disclosure.

Example 1: Graphene Oxide Process for Producing Graphene Foam-Protected Red Phosphorus The graphene walls in a graphene foam structure can function as heterogeneous nucleation sites for promoting the formation of nano-crystalline red phosphorus. The method of producing graphene-nucleated nanocrystals involves deposition of red phosphorus from its vapor state on graphene-based pore walls.

In an experiment, primary particles of red phosphorus 200 nm in diameter and graphene oxide sheets (available from Taiwan Graphene Co.) were then dispersed in water to form a slurry (6% by wt. solid content), which was cast onto a glass plate using a drawdown bar. The cast film was heated to 350° C. to obtain a layer of graphene foam having red phosphorus particles residing in the pores of the foam. This is herein referred to as Sample 1A.

Some portion of the film was then heated to 600° C. and maintained at this temperature for 2 hours, followed by natural cooling of the film down to room temperature. The red phosphorus particles residing in pores of the resulting graphene foam have been sublimed to become vapor and the cooled to re-deposit as a nano-coating having a thickness typically from 5 nm to 30 nm. The final product contains nano-scaled red phosphorus coating that has been nucleated and grown on graphene-based pore wall surfaces. This is herein referred to as Sample 1B.

The amount of GO was designed in such a manner that the final graphene proportion in the graphene foam-protected phosphorus was typically from 0.01% to 30%, but more typically from 0.1% to 10% by weight.

These two types of films, bonded on Cu foil surfaces, were used as an anode electrode layer in two sodium-ion batteries. Electrochemical characterization was conducted by using CR2032-type coin cell wherein Na metal was used as the counter and reference electrode. Disc-shape electrodes were punched into 12 mm size. The average loading mass of electrodes was 4.5 mg/cm$^2$. Also, 1 M solution of NaPF6 in ethylene carbonate (EC) and diethyl carbonate (DEC) (1:1, v/v) with 5% by mass flouro-ethylene carbonate (FEC) was employed as an electrolyte, and glass fiber fabric was used as a porous separator. The coin cell was fabricated in an Ar-filled glove box. Galvanostatic charge-discharge cycling test was performed between 0.01 and 2 V vs. Na$^+$/Na at various rates or current densities (0.1 to 2 A/g).

Figure 5:
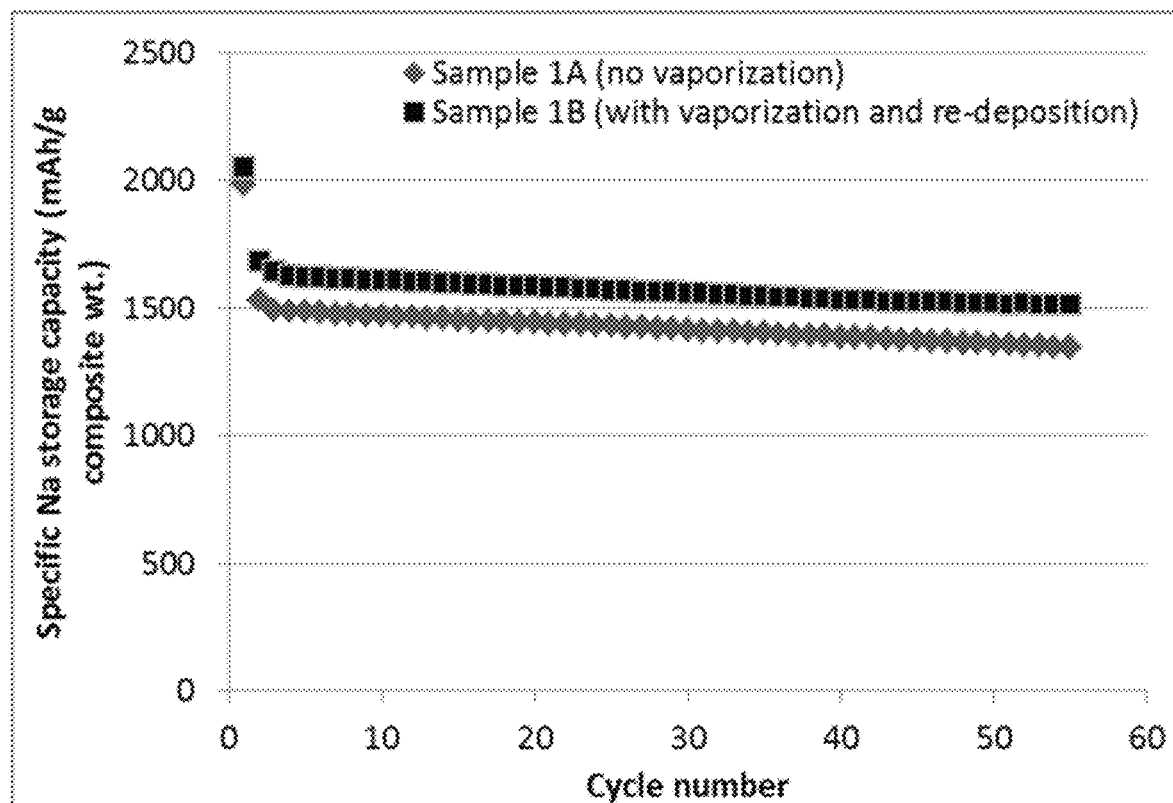
FIG. 5 The specific sodium ion storage capacity curves (mAh/g-composite) of Samples 1A and 1B, respectively. The specific capacity is calculated on the basis of the entire composite anode layer (the weight of graphene foam and weight of the phosphorus material combined).

Shown in FIG. 5 are two specific capacity curves (mAh/g-composite) of Samples 1A and 1B, respectively. These data indicate that Sample 1B (with an additional step of vaporizing phosphorus and redepositing it in thin coating form on surfaces of pore wall graphene) delivers the highest specific capacity (2055 mAh/g-composite; based on the total composite weight, not just P weight), highest first-cycle Coulomb efficiency (unprecedented 82%), and most stable cycling behavior. Sample 1A also shows exceptional specific capacity (1984 mAh/g-composite), first-cycle efficiency (77%, excellent value for P-based anode material), and relatively stable cycling behavior.

It may be noted that the specific sodium ion storage capacity values in FIG. 5 are calculated based on the total anode electrode weight (excluding anode current collector and resin binder), not just the phosphorus weight. As opposed to the specific capacity value (mAh/g-phosphorus) calculated based on the phosphorus weight alone, as done in most of the scientific articles [e.g. Ref. 6], the specific capacity based on the total composite weight is significantly more meaningful, particularly when it comes to the calculation of the actual cell specific energy density (Wh/kg). For instance, even though Lee, et al. [Ref. 6] reported a specific capacity as high as 2,250 mAh/g-p (based on the weight of P alone), the P content in the anode structure is only 23.1% by mass and, as such, the actual specific capacity of Lee's anode is 2250×0.231=520 mAh/g-composite. In the entire anode electrode, only 23.1% of the materials used are capable of storing Na ions; other components in the anode composite and electrode structure being non-active material (just adding weight and volume to the electrode without adding additional ion storage capacity).

Example 2: Preparation of Graphene Oxide (GO) Suspension from Natural Graphite and Preparation of Subsequent GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension on a polyethylene terephthalate (PET) film in a slurry coater (a slot-die coating machine) and removing the liquid medium from the coated film we obtained a thin film of dried graphene oxide. Several GO film samples after peeling off from PET substrate were then subjected to different heat treatments, which typically include a thermal reduction treatment at a first heat treatment temperature of 50° C. to 350° C. for 5 hours. This is herein referred to as Sample 2A.

Some amount of the graphene foam-protected anode as in Sample 2A was further treated at a second heat treatment temperature of 600° C. for 1 hour (when red phosphorous was used as the anode active material; herein referred to as Sample 2B) or 2,000° C. for 1 hour (when transition metal phosphide was used). With these heat treatments, under a compressive stress, the GO films were transformed into graphene foam. Again, it may be noted that when a transition metal phosphide (MP$_y$) is present in the graphene foam, the first or second heat treatment temperature may be higher than 1,500° C.; however, the graphene foam containing an elemental phosphorus (e.g. red phosphorus or black phosphorus), the heat treatment temperature should not go higher than 1,000° C., preferably no higher than 700° C.

We have found it essential to apply a compressive stress to the coating film sample while being subjected to the first heat treatment. This compress stress seems to have helped maintain good contacts between the graphene sheets so that chemical merging and linking between graphene sheets can occur while pores are being formed. Without such a compressive stress, the heat-treated film is typically excessively porous with constituent graphene sheets in the pore walls being very poorly oriented and the walls are relatively weak. Also, the thermal conductivity and electrical conductivity of the graphene foam are severely compromised.

Figure 6:
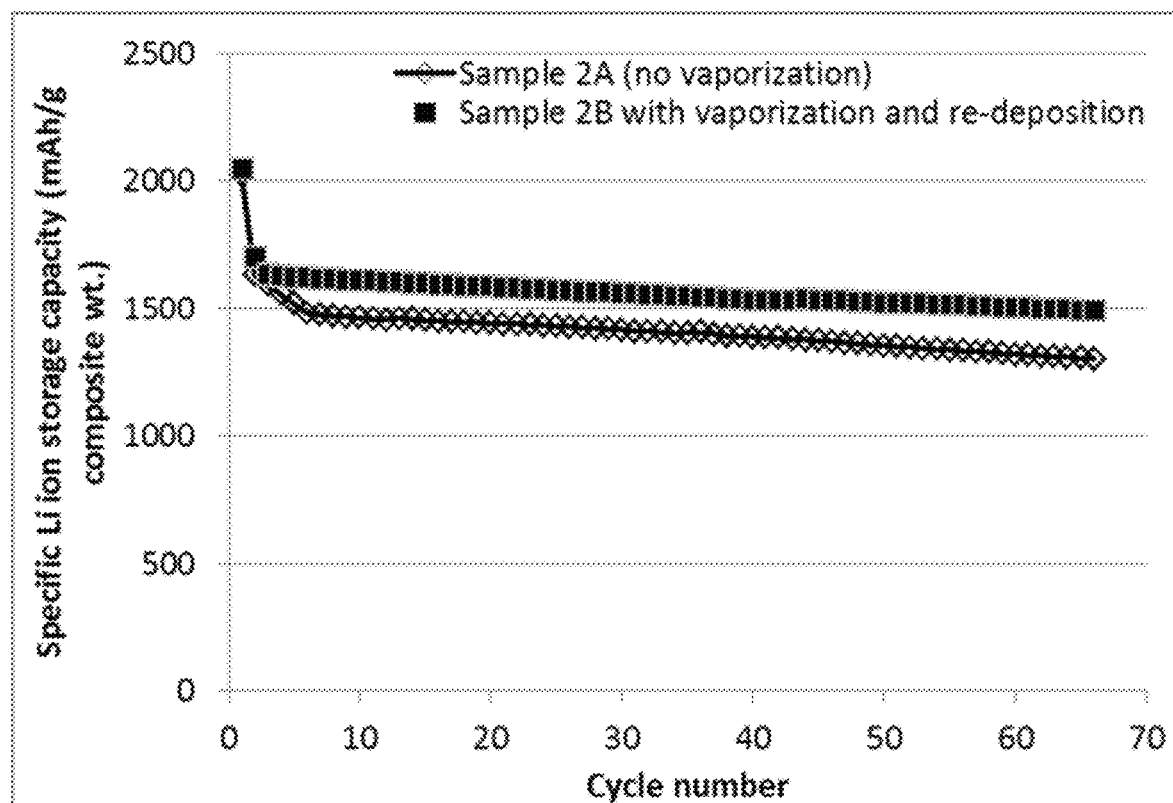
FIG. 6 The specific lithium ion storage capacity curves (mAh/g-composite) of two anode electrodes each comprising graphene foam-protected red phosphorus: one containing red phosphorus particles residing in pores of the graphene foam and the other containing de-deposited thin coating of red phosphorus on pore wall graphene surfaces.

Graphene foam-protected anode films from both Sample 2A and Sample 2B were cut into discs and used as electrodes of lithium-ion batteries according to a procedure described in Example 8 below. FIG. 6 shows two specific lithium ion storage capacity curves (mAh/g-composite) of two graphene foam protected anode electrodes. Sample 2A and Sample 2B exhibit similar initial specific lithium ion storage capacity. However, after a few cycles, Sample 2B delivers better electrochemical responses. In Sample 2A, the red phosphorus particles simply reside in the pores of the graphene foam structure. In Sample 2B, the red phosphorus is re-deposited as thin coating onto pore wall graphene surfaces, making better contact thereto. The red phosphorus coating has a thickness smaller than the diameter of original red phosphorus particles and, as such, there are more phosphorus-to-graphene contact surface areas, making better use of the high electrical conductivity of graphene in the pore walls.

Example 3: Preparation of Single-Layer Graphene Sheets and Graphene Foam from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The suspension was then cast onto a glass surface using a guiding wiper to exert shear stresses, inducing GO sheet orientations. Several samples were cast, some containing a blowing agent and some not. The resulting GO films, after removal of liquid, have a thickness that can be varied from approximately 10 to 500 μm.

Then, several sheets of the GO film, with or without a blowing agent, were then subjected to heat treatments that include an initial (first) thermal reduction temperature of 80-500° C. for 1-5 hours. This first heat treatment generated a graphene foam. However, the graphene domains in the foam wall can be further perfected (re-graphitized to become more ordered or having a higher degree of crystallinity and larger lateral dimensions of graphene planes, longer than the original graphene sheet dimensions due to chemical merging) if the foam is followed by heat-treating at a second temperature of 1,500-2,850° C.

Select GO suspension samples were added with particles of a phosphorus material prior to casting or coating for making graphene foam-protected phosphorus anode electrodes.

Example 4: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast, including one that was made using $CO_2$ as a physical blowing agent introduced into the suspension just prior to casting). The resulting graphene films, after removal of liquid, have a thickness that can be varied from approximately 10 to 100 μm.

The graphene films were then subjected to heat treatments that involve an initial (first) thermal reduction temperature of 80-1,500° C. for 1-5 hours. This first heat treatment led to the production of a graphene foam. Some of the pristine foam samples were then subjected to a second temperature of 1,500-2,850° C. to determine if the graphene domains in the foam wall could be further perfected (re-graphitized to become more ordered or having a higher degree of crystallinity). Thermal conductivity measurements led to the following results:
1) GO-derived graphene foams produced by the presently disclosed process exhibit very high thermal conductivity.
2) The specific thermal conductivity values of the presently disclosed GO- and GF-derived foam exhibit values from 250 to 500 W/mK per unit of specific gravity.

Example 5: Graphene Foams from Hydrothermally Reduced Graphene Oxide

Graphene foam may also be prepared by other processes. For example, a self-assembled graphene hydrogel (SGH) sample was prepared by a one-step hydrothermal method. In a typical procedure, the SGH was prepared by heating 2 mg/mL of homogeneous graphene oxide (GO) aqueous dispersion (with or without particles of a phosphorus material) sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,000° C., the resulting graphene foam exhibits an electrical conductivity of approximately $1.1 \times 10^{-1}$ S/cm, which is 2 times lower than those of the graphene foams produced by heat treating at the same temperature.

The hydrothermal method for producing graphene foams typically provide macro-porous foams having a physical density in the range from approximately 0.2-0.6 g/cm$^3$ having pore sizes being typically from 1 to 30 μm. In contrast, the suspension coating and heating processes can controllably generate graphene foams having a density from 0.01 g/cm$^3$ to 1.7 g/cm$^3$. The pore sizes can be varied between meso-scaled (2-50 nm) and macro-scaled (typically 1-100 μm) depending upon the contents of non-carbon elements and the amount/type of blowing agent used. This level of flexibility and versatility in designing various types of graphene foams has tremendous utility value.

Example 6: Preparation of Graphene Foams from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogeneous dispersion, but longer sonication times ensured better stability. Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 g/cm³. When a blowing agent was used (blowing agent/GF weight ratio from 0.5/1 to 0.05/1), a density from 0.02 to 0.35 g/cm³ was obtained. Typical fluorine contents are from 0.001% (HTT=2,500° C.) to 4.7% by weight (HTT=350° C.), depending upon the final heat treatment temperature involved.

On a separate basis, black phosphorus crystals were prepared from red phosphorus. In a representative procedure, red phosphorus (900 mg), AuSn alloy (360 mg), and $SnI_4$ (18 mg) were first sealed in a quartz ampoule (13 cm in length and 15 mm in diameter) that was evacuated to a pressure lower than $10^{-3}$ mbar. The sealed ampoule was then placed horizontally in the reaction zone of a tube furnace and heated to 650° C. in 1 h. After exposure to 650° C. for 24 h, the ampoule was cooled to 500° C. at a rate of 30° C./h, and then cooled to room temperature after being held at 500° C. for 30 min. This procedure led to the formation of large BP crystals (about 850 mg) on the cold end of the ampoule. The BP crystals were recovered and washed with toluene to remove the residual mineralizer, followed by water and acetone rinsing.

The liquid phase exfoliation method was then used to exfoliate BP crystals into monolayer and few-layer BP platelets. This procedure began with grinding the BP crystals to fine powder particles, which were dispersed in deionized water (20 mL) with an initial concentration of 5 mg/mL by tip sonication for 2 hours. After the dispersion had settled for 12 h, the supernatant was decanted and then centrifuged at 1500-5000 rpm for 30 min. Finally, the resulting BP nano-sheet dispersion (supernatant) was collected and mixed with graphene fluoride-water suspension (containing some surfactant), along with baking soda (0.1% by weight) to obtain a slurry. The slurry was then comma-coated into wet layers on PET films. After peeling and drying from the PET film, the GF/BP nano-sheet mixture was heat treated at 150° C. for 0.5 hours and 500° C. for 2 hours.

Figure 7:
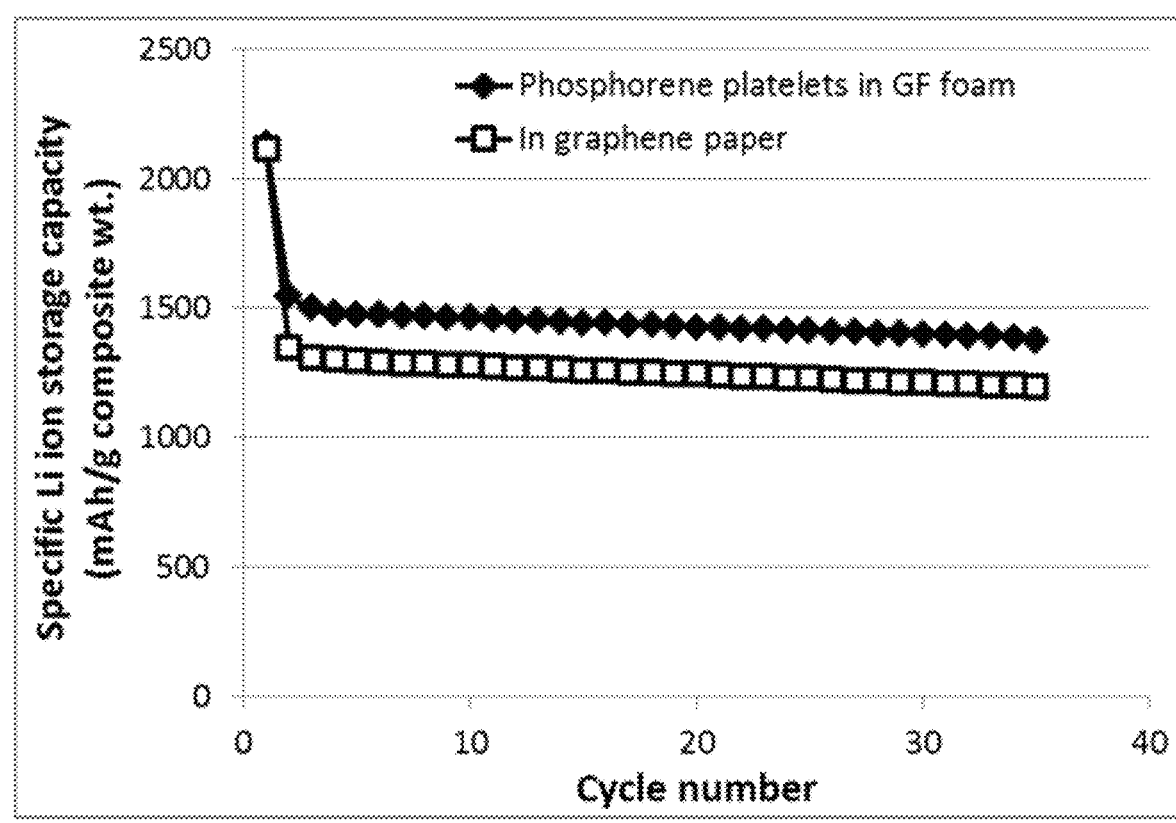
FIG. 7 The specific lithium ion storage capacity curves (mAh/g-composite) of two anode active material layers: Sample 3A comprises graphene fluoride (GF) foam protected phosphorene nano platelets and Sample 3B comprises phosphorene platelets and GF sheets packed into a sheet of paper-like structure.

The resulting layer of graphene fluoride (GF)-protected phosphorene nano-sheets was made into anode electrodes by following the procedure described in Example 8. This is herein referred to as Sample 3A. Separately, BP nano-sheet dispersion mixed with graphene fluoride-water suspension was made into phosphorene/GF composite paper using a vacuum-assisted filtration process. Such a paper-like structure was used directly as an anode electrode, herein referred to as Sample 3B. The specific lithium ion storage capacity values of the two anodes, using a Li metal disc as a counter electrode, are shown in FIG. 7. These data indicate the superior electrochemical performance of the graphene foam-protected phosphorene platelets as compared to the paper-like structure.

Example 7: Preparation of Graphene Foams from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained have nitrogen contents of 14.7, 18.2 and 17.5 wt % by weight respectively as measured by elemental analysis. These nitrogenated graphene sheets remain dispersible in water. The resulting suspensions (with or without particles of a phosphorus material) were then cast, dried, and heat-treated initially at 200-350° C. as a first heat treatment temperature and subsequently treated at a second temperature of 1,500° C. The resulting nitrogenated graphene foams exhibit physical densities from 0.45 to 1.28 g/cm³. Typical nitrogen contents of the foams are from 0.01% (HTT=1,500° C.) to 5.3% by weight (HTT=350° C.), depending upon the final heat treatment temperature involved.

Example 8: Electrochemical Performance of Various Rechargeable Lithium-Ion Battery Cells For electrochemical testing, both pouch cells and coin cells were prepared. The presently disclosed layers of graphene foam-protected phosphorus can be directly used as an anode electrode. For coin-cell testing, a lithium metal disc was used as the counter-electrode and reference electrode. The conventional working electrodes were prepared by mixing 85 wt % active material (e.g. cathode active material particles only), 7 wt. % acetylene black (Super-P), and 8 wt % polyvinylidene fluoride binder resin (PVDF, 5 wt. % solid content) dissolved in N-methyl-2-pyrrolidinoe (NMP). After coating the slurries on a sheet of carbon fiber mat, the electrodes were dried at 120° C. in vacuum for 2 h to remove the solvent before pressing. A variety of cathode active materials were used in preparing the pouch cells (full cells). The CV measurements were carried out using an electrochemical workstation at a scanning rate of 1 mV/s.

We claim:
1. An anode or negative electrode layer for a lithium-ion battery or sodium-ion battery, said anode layer comprising multiple particles or coating of a phosphorus material and a solid graphene foam composed of multiple pores and pore walls, wherein said pores have a pore size from 2 nm to 20 µm and wherein
   a) said pore walls contain a pristine graphene material having less than 0.01% by weight of non-carbon elements or a non-pristine graphene material having 0.01% to 5% by weight of non-carbon elements, wherein said non-pristine graphene is selected from the group consisting of graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, and combinations thereof;
   b) said phosphorus material is in an amount from 20% to 99% by weight based on the total weight of said solid graphene foam and said phosphorus material combined and said phosphorus material has a diameter or thickness from 0.5 nm to 10 µm and is selected from red phosphorus, black phosphorus, violet phosphorus, a metal phosphide, $MP_y$, or a combination thereof, wherein M=Mn, V, Sn, Ni, Cu, Fe, Co, Zn, Ge, Se, Mo, Ga, In, or an alloy thereof, and $1 \leq y \leq 4$; and
   c) some of the multiple pores are lodged with said particles or coating of the phosphorus material.

2. The anode layer of claim 1, wherein some of the multiple pores are free of said phosphorus material, and said solid graphene foam accommodates volume expansion and shrinkage of said particles or coating of the phosphorus material during a battery charge-discharge cycle to avoid expansion of said anode layer.

3. The anode layer of claim 1, wherein said solid graphene foam has a density from 0.01 to 1.7 g/cm$^3$, a specific surface area from 50 to 2,000 m$^2$/g, a thermal conductivity of at least 100 W/mK per unit of specific gravity, and/or an electrical conductivity no less than 1,000 S/cm per unit of specific gravity.

4. The anode layer of claim 1, wherein said phosphorus material is in a form of nano-particle, nano-wire, nano-fiber, nano-tube, nano-sheet, nano-belt, nano-ribbon, or nano-coating having a thickness or diameter from 0.5 nm to 100 nm.

5. The anode layer of claim 1, further comprising a carbon or graphite material disposed therein, wherein said carbon or graphite material is in electronic contact with or deposited onto particles of said phosphorus material.

6. The anode layer of 5, wherein said carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

7. The anode layer of claim 4, further comprising a conductive protective coating, selected from a carbon material, electronically conductive polymer, conductive metal oxide, conductive metal coating, or a lithium-conducting material, which is deposited onto or wrapped around said nano-particle, nano-wire, nano-fiber, nano-tube, nano-sheet, nano-belt, nano-ribbon, or nano-coating.

8. The anode layer of claim 1, further comprising a lithium-conducting or sodium-conducting coating deposited onto said phosphorus material.

9. The anode layer of claim 1, wherein said pore walls contain stacked graphene planes having an inter-plane spacing $d_{002}$ from 0.3354 nm to 0.36 nm as measured by X-ray diffraction.

10. The anode layer of claim 1, wherein said pore walls contain a pristine graphene and said solid graphene foam has a density from 0.5 to 1.7 g/cm$^3$ or said pores have a pore size from 2 nm to 100 nm.

11. The anode layer of claim 1, wherein said non-pristine graphene material contains a content of non-carbon elements from 0.01% to 2.0% by weight.

12. The anode layer of claim 1, wherein said pore walls contain graphene fluoride and said solid graphene foam contains a fluorine content from 0.01% to 2.0% by weight.

13. The anode layer of claim 1, wherein said pore walls contain graphene oxide and said solid graphene foam contains an oxygen content from 0.01% to 2.0% by weight.

14. The anode layer of claim 1, wherein said solid graphene foam has a specific surface area from 200 to 2,000 m$^2$/g or a density from 0.1 to 1.5 g/cm$^3$.

15. The anode layer of claim 1, wherein said non-carbon elements include an element selected from oxygen, fluorine, chlorine, bromine, iodine, nitrogen, hydrogen, or boron.

16. The anode layer of claim 1, which is in a continuous-length roll sheet form having a length of at least 2 meters and is produced by a roll-to-roll process.

17. The anode layer of claim 1, wherein said graphene foam has an oxygen content or non-carbon content less than 1% by weight, and said pore walls have an inter-graphene spacing less than 0.35 nm, a thermal conductivity of at least 250 W/mK per unit of specific gravity, and/or an electrical conductivity no less than 2,500 S/cm per unit of specific gravity.

18. The anode layer of claim 1, wherein said graphene foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

19. The anode layer of claim 1, wherein said graphene foam has an oxygen content or non-carbon content no greater than 0.01% by weight and said pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

20. The anode layer of claim 1, wherein said graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

21. The anode layer of claim 1, wherein the pore walls contain stacked graphene planes having an inter-graphene spacing less than 0.337 nm and a mosaic spread value less than 1.0.

22. The anode layer of claim 1, wherein said pore walls contain a 3D network of interconnected graphene planes.

23. The anode layer of claim 1, wherein said solid graphene foam contains pores having a pore size from 20 nm to 500 nm.

24. A lithium-ion battery or sodium-ion battery containing the anode or negative electrode layer as defined in claim 1, a cathode or positive electrode, and an electrolyte in ionic contact with said anode and said cathode.

25. The battery of claim 24, further containing a cathode current collector in electronic contact with said cathode.

26. The battery of claim 24, further containing an anode current collector in electronic contact with said anode.

27. The battery of claim 24, wherein said graphene foam operates as an anode current collector to collect electrons from said anode active material during a charge of said lithium battery, which contains no separate or additional current collector.

28. A process for producing the anode layer of claim 1, said process comprising:
(a) preparing a graphene dispersion having multiple particles of said phosphorus material and multiple sheets of a starting graphene material dispersed in a liquid medium, wherein said starting graphene material is selected from a pristine graphene or a non-pristine graphene material selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein said dispersion contains an optional blowing agent having a blowing agent-to-graphene material weight ratio from 0/1.0 to 1.0/1.0;
(b) dispensing and depositing said graphene dispersion onto a surface of a supporting substrate to form a wet layer of graphene/phosphorus material mixture, wherein said dispensing and depositing procedure includes subjecting said graphene dispersion to an orientation-inducing stress;

(c) partially or completely removing said liquid medium from the wet layer of graphene/phosphorus material to form a dried layer of mixture material; and (d) heat treating the dried layer of mixture material at a first heat treatment temperature selected from 50° C. to 1,500° C. at a desired heating rate sufficient to induce volatile gas molecules from said non-carbon elements or to activate said blowing agent for producing said anode layer.

29. The process of claim 28, further including a step of heat-treating the anode layer at a second heat treatment temperature higher than said first heat treatment temperature for a length of time sufficient for obtaining a anode layer wherein said pore walls contain stacked graphene planes having an inter-plane spacing $d_{002}$ from 0.3354 nm to 0.36 nm and a content of non-carbon elements less than 2% by weight.

30. The process of claim 28, wherein said graphene material contains pristine graphene and said dispersion contains a blowing agent having a blowing agent-to-pristine graphene weight ratio from 0.01/1.0 to 1.0/1.0.

31. The process of claim 28, wherein said blowing agent is a physical blowing agent, a chemical blowing agent, a mixture thereof, a dissolution-and-leaching agent, or a mechanically introduced blowing agent.

32. The process of claim 28, wherein said graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, and combinations thereof, and wherein said solid graphene foam contains a content of non-carbon elements from 0.01% to 2.0% by weight.

33. The process of claim 28, which is a roll-to-roll process wherein said steps (b) and (c) include feeding said supporting substrate from a feeder roller to a deposition zone, continuously or intermittently depositing said graphene dispersion onto a surface of said supporting substrate to form said wet layer of graphene material thereon, drying said wet layer of graphene material to form the dried layer of graphene material, and collecting said dried layer of graphene material deposited on said supporting substrate on a collector roller.

34. The process of claim 28, wherein said first heat treatment temperature is selected from 50° C. to 1,500° C.

35. The process of claim 29, wherein said second heat treatment temperature includes at least a temperature selected from (A) 1,500-2,100° C. or (B) 2,100-3,200° C.

36. The process of claim 28, wherein said step (d) of heat treating the dried layer of graphene material at a first heat treatment temperature is conducted under a compressive stress.

37. The process of claim 28, further comprising a compression step to reduce a thickness, a pore size, or a porosity level of said solid graphene foam.

38. The process of claim 28, wherein said graphene dispersion contains a graphene oxide dispersion prepared by immersing a graphitic material in a powder or fibrous form in an oxidizing liquid in a reaction vessel at a reaction temperature for a length of time sufficient to obtain said graphene dispersion wherein said graphitic material is selected from natural graphite, artificial graphite, mesophase carbon, meso-phase pitch, meso-carbon micro-bead, soft carbon, hard carbon, coke, carbon fiber, carbon nano-fiber, carbon nano-tube, or a combination thereof and wherein said graphene oxide has an oxygen content no less than 5% by weight.

39. A roll-to-roll process for producing a continuous-length sheet of the anode layer of claim 1, said process comprising:

(a) preparing a graphene dispersion having a graphene material and a phosphorus material dispersed in a liquid medium;

(b) continuously or intermittently dispensing and depositing said graphene dispersion onto a surface of a supporting substrate to form a wet layer of graphene-phosphorus material mixture, wherein said supporting substrate is a continuous thin film supplied from a feeder roller and collected on a collector roller;

(c) partially or completely removing said liquid medium from the wet layer of graphene-phosphorus material mixture to form a dried layer of mixture material; and (d) heat treating the dried layer of mixture material at a first heat treatment temperature selected from 50° C. to 1,500° C. at a desired heating rate sufficient to activate said blowing agent for producing said anode layer.

40. A process for producing the anode layer of claim 1, said process comprising:

(a) preparing a graphene oxide dispersion having multiple particles of said phosphorus material and multiple sheets of graphene oxide sheets dispersed in a water or water-alcohol mixture;

(b) sealing said graphene oxide dispersion in an autoclave and subjecting the dispersion to a hydrothermal treatment at a pressure from 1.1 atm to 100 atm and a temperature from 50° C. to 500° C. for a period of time sufficient to produce graphene foam having said phosphorus material residing in pores of said graphene foam; and (c) removing water or water-alcohol mixture from said graphene foam to produce the anode material.

* * * * *